United States Patent
Geng et al.

(10) Patent No.: US 12,008,285 B2
(45) Date of Patent: Jun. 11, 2024

(54) IMAGE PROCESSING METHOD AND DISPLAY CONTROL METHOD

(71) Applicant: BOE TECHNOLOGY GROUP CO., LTD., Beijing (CN)

(72) Inventors: Lihua Geng, Beijing (CN); Xitong Ma, Beijing (CN); Ran Duan, Beijing (CN); Xiaodong Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/016,430

(22) PCT Filed: Nov. 10, 2021

(86) PCT No.: PCT/CN2021/129899
§ 371 (c)(1),
(2) Date: Jan. 16, 2023

(87) PCT Pub. No.: WO2022/205924
PCT Pub. Date: Oct. 6, 2022

(65) Prior Publication Data
US 2023/0273760 A1   Aug. 31, 2023

(30) Foreign Application Priority Data
Mar. 31, 2021   (CN) .................. 202110349875.2

(51) Int. Cl.
*G06F 3/14*     (2006.01)
*G06T 3/40*     (2006.01)
*G06T 7/90*     (2017.01)
*G06V 10/25*    (2022.01)
*G06V 10/56*    (2022.01)

(52) U.S. Cl.
CPC .................. *G06F 3/14* (2013.01); *G06T 3/40* (2013.01); *G06T 7/90* (2017.01); *G06V 10/25* (2022.01); *G06V 10/56* (2022.01); *G06T 2207/10024* (2013.01)

(58) Field of Classification Search
CPC ........ G06F 3/14; G06F 9/4401; G06F 9/4406; G06F 9/451; G06T 3/40; G06T 7/90; G06T 2207/10024; G06V 10/25; G06V 10/56; G06V 10/764; G09G 2330/026;
(Continued)

(56) References Cited

U.S. PATENT DOCUMENTS

| | | | |
|---|---|---|---|
| 2015/0254802 A1* | 9/2015 | Sartor | ........................ G06T 3/40 345/660 |
| 2017/0039680 A1 | 2/2017 | Abe | |
| 2019/0073972 A1* | 3/2019 | Gao | ........................ G09G 3/3648 |

FOREIGN PATENT DOCUMENTS

| | | | |
|---|---|---|---|
| CN | 106847228 A | | 6/2017 |
| CN | 108153570 A | * | 6/2018 |

(Continued)

*Primary Examiner* — Brent D Castiaux
(74) *Attorney, Agent, or Firm* — IP & T GROUP LLP

(57) ABSTRACT

An image processing method includes: using image data of a first image as image data of a base region, wherein the first image has a first resolution; and generating, based on the image data of the first image, image data of an extended region according to extension policies, so as to obtain image data of a second image including the image data of the base region and the image data of the extended region, wherein the second image has a second resolution, and the first resolution is less than the second resolution.

19 Claims, 8 Drawing Sheets

(58) Field of Classification Search
CPC ........... G09G 5/373; G09G 2340/0442; G09G 2340/045; G09G 3/20; Y02D 10/00
See application file for complete search history.

(56) References Cited

FOREIGN PATENT DOCUMENTS

| | | |
|---|---|---|
| CN | 111459431 A | 7/2020 |
| CN | 113050999 A | 6/2021 |

* cited by examiner

IMAGE PROCESSING METHOD AND DISPLAY CONTROL METHOD

CROSS-REFERENCE TO RELATED APPLICATIONS

This application is a national phase entry under 35 USC 371 of International Patent Application No. PCT/CN2021/129899, filed on Nov. 10, 2021, which claims priority to Chinese Patent Application No. 202110349875.2, filed on Mar. 31, 2021, which are incorporated herein by reference in their entirety.

TECHNICAL FIELD

The present disclosure relates to the field of display technologies, and in particular, to an image processing method, a display control method, and non-transitory computer-readable storage media.

BACKGROUND

When a display apparatus (e.g., a displayer) is started up, the display apparatus needs a certain amount of preparation time to display normally. The display apparatus may display a startup picture during the startup preparation period after it is started up and before it can be used normally. In this way, it may allow the user know that the display apparatus has been turned on and is being booted, thereby eliminating the user's anxiety and tedium of waiting. The startup picture may generally include information such as a company logo and product model.

SUMMARY

In a first aspect, an image processing method is provided. The image processing method includes: using image data of a first image as image data of a base region; and generating, based on the image data of the first image, image data of an extended region according to extension policies, so as to obtain image data of a second image, the image data of the second image including the image data of the base region and the image data of the extended region. The first image has a first resolution, the second image has a second resolution, and the first resolution is less than the second resolution.

In some embodiments, generating, based on the image data of the first image, the image data of the extended region according to the extension policies, includes: generating, based on a pixel value of at least one pixel in a border of the first image, the image data of the extended region according to the extension policies.

In some embodiments, the border of the first image includes a solid-colored border. Generating, based on the pixel value of the at least one pixel in the border of the first image, the image data of the extended region according to the extension policies, includes: using a pixel value of a single pixel in the border of the first image as a pixel value of each pixel in the extended region, so as to obtain the image data of the extended region.

In some embodiments, the border of the first image includes a non-solid-colored border. Generating, based on the pixel value of the at least one pixel in the border of the first image, the image data of the extended region according to the extension policies, includes: generating, based on pixel values of a plurality of pixels in the border of the first image, the image data of the extended region according to the extension policies.

In some embodiments, the non-solid-colored border of the first image includes a border, a color of which gradually changes in a column direction and does not change in a row direction. The extended region includes first sub-regions and second sub-regions except the first sub-regions, and the first sub-regions are flush with the base region in the row direction. Generating, based on the pixel values of the plurality of pixels in the border of the first image, the image data of the extended region according to the extension policies, includes: generating, according to a pixel value of at least one pixel, located at the border, in each row of pixels of the first image, a pixel value of each pixel in a corresponding row of pixels in the first sub-regions; and obtaining, according to a change trend of the pixel values of the plurality of pixels in the border of the first image in the column direction, pixel values of a plurality of rows of pixels that change in the column direction in the second sub-regions. Each row of pixels have the same pixel value, and each pixel value is within a range of s pixel value.

In some embodiments, generating, according to the pixel value of the at least one pixel, located at the border, in each row of pixels of the first image, the pixel value of each pixel in the corresponding row of pixels in the first sub-regions, includes: using a pixel value of a pixel, located at the border, in each row of pixels of the first image as the pixel value of each pixel in the corresponding row of pixels of the first sub-regions.

In some embodiments, the non-solid-colored border of the first image includes a border, a color of which gradually changes in a row direction and does not change in a column direction. The extended region includes third sub-regions and fourth sub-regions except the third sub-regions, and the third sub-regions are flush with the base region in the column direction. Generating, based on the pixel values of the plurality of pixels in the border of the first image, the image data of the extended region according to the extension policies, includes: generating, according to a pixel value of at least one pixel, located at the border, in each column of pixels of the first image, a pixel value of each pixel in a corresponding column of pixels in the third sub-regions; and obtaining, according to a change trend of the pixel values of the plurality of pixels in the border of the first image in the row direction, pixel values of a plurality of columns of pixels that change in the row direction in the fourth sub-regions. Each column of pixels have the same pixel value, and each pixel value is within a range of a pixel value.

In some embodiments, generating, according to the pixel value of the at least one pixel, located at the border, in each column of pixels of the first image, the pixel value of each pixel in the corresponding column of pixels in the third sub-regions, includes: using a pixel value of a pixel, located at the border, in each column of pixels of the first image as the pixel value of each pixel in the corresponding column of pixels of the third sub-regions.

In some embodiments, the non-solid-colored border of the first image includes a border, a color of which gradually changes both in a column direction and in a row direction. The extended region includes fifth sub-regions, sixth sub-regions, and seventh sub-regions except the fifth sub-regions and the sixth sub-regions, and the fifth sub-regions are flush with the base region in the row direction, and the sixth sub-regions are flush with the base region in the column direction. Generating, based on the pixel values of the plurality of pixels in the border of the first image, the image data of the extended region according to the extension policies, includes:

obtaining, according to a change trend of pixel values of pixels in a row in the border of the first image in the row direction, pixel values of a corresponding row of pixels in the fifth sub-regions, so as to obtain image data of the fifth sub-regions, wherein each pixel value is within a range of a pixel value; obtaining, according to a change trend of pixel values of pixels in a column in the border of the first image in the column direction, pixel values of a corresponding column of pixels in the sixth sub-regions, so as to obtain image data of the sixth sub-regions, wherein each pixel value is within the range of the pixel value; and obtaining image data of the seventh sub-regions based on the image data of the fifth sub-regions and/or the image data of the sixth sub-regions.

In some embodiments, obtaining the image data of the seventh sub-regions based on the image data of the fifth sub-regions and/or the image data of the sixth sub-regions, includes: averaging pixel values of two pixels adjacent to a pixel, respectively in the row direction and in the column direction, in a seventh sub-region to obtain a pixel value of the pixel in the seventh sub-region.

In some embodiments, obtaining the image data of the seventh sub-regions based on the image data of the fifth sub-regions and/or the image data of the sixth sub-regions, includes: obtaining, according to a change trend of pixel values of pixels in a row in a border of a sixth sub-region adjacent to a seventh sub-region in the row direction, pixel values of a corresponding row of pixels in the seventh sub-region, wherein each pixel value is within the range of the pixel value, or obtaining, according to a change trend of pixel values of pixels in a column in a border of a fifth sub-region adjacent to a seventh sub-region in the column direction, pixel values of a corresponding column of pixels in the seventh sub-region, wherein each pixel value is within the range of the pixel value.

In some embodiments, generating, based on the image data of the first image, the image data of the extended region according to the extension policies, includes: generating the image data of the extended region according to pixel values of all pixels in the first image.

In some embodiments, the first image includes a border irregular in color. Generating the image data of the extended region according to the pixel values of all the pixels in the first image, includes: averaging the pixel values of all the pixels in the first image to obtain a pixel value of each pixel in the extended region.

In some embodiments, the image processing method further includes: identifying a type of the first image according to pixel values of a plurality of pixels in a border of the first image. Generating, based on the image data of the first image, the image data of the extended region according to the extension policies, includes: generating, based on the image data of the first image, the image data of the extended region according to an extension policy corresponding to the type of the first image.

In some embodiments, the border of the first image includes two first sub-borders parallel to a row direction and two second sub-borders parallel to a column direction. Identifying the type of the first image according to the pixel values of the plurality of pixels in the border of the first image, includes: determining the type of the first image according to a change trend of pixel values of pixels in each first sub-border in the row direction and a change trend of pixel values of pixels in each second sub-border in the column direction.

In some embodiments, the type of the first image is a first type, a second type, a third type, a fourth type or a fifth type. The first type is configured to represent that the border of the first image includes a solid-colored border. The second type is configured to represent that the border of the first image includes a border, a color of which gradually changes in the column direction and does not change in the row direction. The third type is configured to represent that the border of the first image includes a border, a color of which gradually changes in the row direction and does not change in the column direction. The fourth type is configured to represent that the border of the first image includes a border, a color of which gradually changes both in the column direction and in the row direction. The fifth type is configured to represent that the border of the first image includes a border irregular in color.

In some embodiments, determining the type of the first image according to the change trend of the pixel values of the pixels in each first sub-border in the row direction and the change trend of the pixel values of the pixels in each second sub-border in the column direction, includes: determining a first determination result of each first sub-border, wherein if pixel values of all pixels in each row of pixels in the first sub-border are approximately equal, the first determination result includes equality, otherwise the first determination result includes inequality; if the pixel values of all the pixels in each row of pixels in the first sub-border gradually change, the first determination result includes gradual change, otherwise the first determination result includes no gradual change; and determining a second determination result of each second sub-border, wherein if pixel values of all pixels in each column of pixels in the second sub-border are approximately equal, the second determination result includes equality, otherwise the second determination result includes inequality; if the pixel values of all the pixels in each column of pixels in the second sub-border gradually change, the second determination result includes gradual change, otherwise the second determination result includes no gradual change. If the first determination result of each first sub-border and the second determination result of each second sub-border both include equality, the first image is of the first type. If the first determination result of each first sub-border includes equality and the second determination result of each second sub-border includes gradual change, the first image is of the second type. If the first determination result of each first sub-border includes gradual change and the second determination result of each second sub-border includes equality, the first image is of the third type. If the first determination result of each first sub-border and the second determination result of each second sub-border both include gradual change, the first image is of the fourth type. If at least one of the first determination result of each first sub-border and the second determination result of each second sub-border includes both inequality and no gradual change, the first image is of the fifth type.

In a second aspect, a display control method is provided, which is applied to a display control apparatus. The display control method includes: reading image data of a startup picture; performing the image processing method provided by any of the above embodiments to obtain the image data of the second image, wherein the first image in the image processing method is the startup picture; and outputting the image data of the second image to control a display panel for display according to the image data of the second image.

In some embodiments, outputting the image data of the second image, includes: outputting the image data of the second image in response to a case where the display control apparatus is in a startup initialization state. The display control method further includes: outputting image data of a working picture in response to an end of the startup initialization state of the display control apparatus.

In a third aspect, a non-transitory computer-readable storage medium is provided. The computer-readable storage medium has stored therein computer program instructions that, when run on a computer (e.g., a display apparatus), cause the computer to perform the image processing method provided by any of the above embodiments, or the display control method provided by any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on are not limitations on actual sizes of products, actual processes of methods and actual timings of signals to which the embodiments of the present disclosure relate.

DETAILED DESCRIPTION

Figure 1:
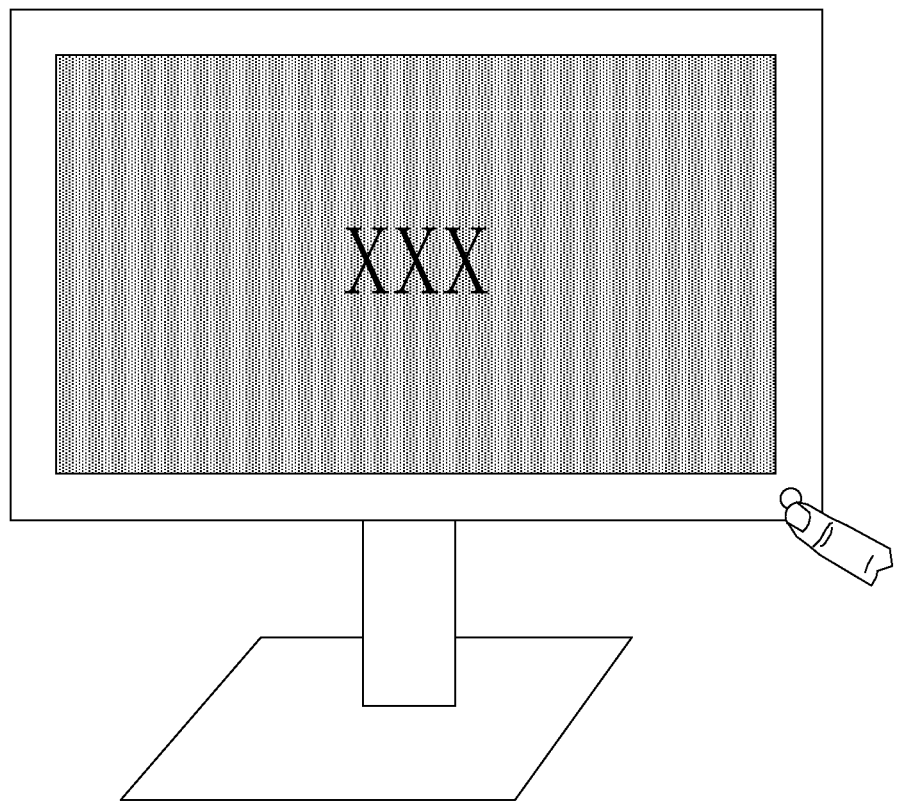
FIG. 1 is a schematic diagram of a startup picture displayed on a displayer when a user performs a startup operation on the displayer.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics may be included in any one or more embodiments or examples in any suitable manner.

Hereinafter, the terms such as "first" and "second" are only used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" as used herein indicates an open and inclusive expression, which does not exclude apparatuses that are applicable to or configured to perform additional tasks or steps.

In addition, the use of the phrase "based on" or "according to" is meant to be open and inclusive, since a process, step, calculation or other action that is "based on" or "according to" one or more of the stated conditions or values may, in practice, be based on additional conditions or values exceeding those stated.

The term "about," "substantially," or "approximately" as used herein includes a stated value and an average value within an acceptable range of deviation of a particular value. The acceptable range of deviation is determined by a person of ordinary skill in the art in consideration of measurement in question and errors associated with measurement of a particular quantity (i.e., limitations of the measurement system).

A startup process of a display apparatus (including a displayer) may include the following steps. First, the displayer receives a startup instruction. In some examples, when the displayer is in a power-off state, a user performs a startup operation on the displayer. For example, referring to FIG. 1, the user may press a power switch of the displayer. For another example, the user may also perform the startup operation on the displayer through a startup gesture, an infrared remote control, etc. In some other examples, when the displayer is in a standby (or hibernation) state, a startup instruction may be sent to the displayer through a host connected to the displayer. Subsequently, the displayer displays a startup picture of the displayer shown in FIG. 1 in response to the startup instruction, so that the user can be informed that the displayer has been turned on and is being booted, thereby eliminating the user's anxiety and tedium of waiting. The startup picture may be stored in a memory of the displayer by the manufacturer of the displayer in advance (e.g., before the product is shipped from a factory), and can be retrieved from the memory of the displayer for display when it needs to be displayed. Thereafter, the displayer may display the booting picture of an operating system in the host.

For high-resolution displayers with a resolution of 4 k (i.e., a resolution of 4096×2160), 8 k (i.e., a resolution of 8192×4320), and the like, a picture displayed by a high-resolution displayer is an image with a corresponding high resolution. Accordingly, the startup picture of such a display is also an image with a corresponding high resolution. Such a startup picture with the high resolution is stored in the memory of the displayer, and in this way, the startup picture with the high resolution occupies a large storage space, which not only occupies a lot of storage resources, but also takes a long time to load the startup picture before the startup picture is displayed.

In order to solve the problem, embodiments of the present disclosure provide a display apparatus, and the display apparatus is a product with an image display function. For example, the display apparatus may be a displayer, a television, a billboard, a digital photo frame, a laser printer with a display function, a telephone, a mobile phone, a personal digital assistant (PDA), a digital camera, a camcorder, a viewfinder, a navigator, a vehicle, a large-area wall, a household appliance, an information inquiry device (e.g., a business inquiry device of an electronic government, a bank, a hospital, an electric power department, and other departments), a monitor, or the like.

Figure 2:
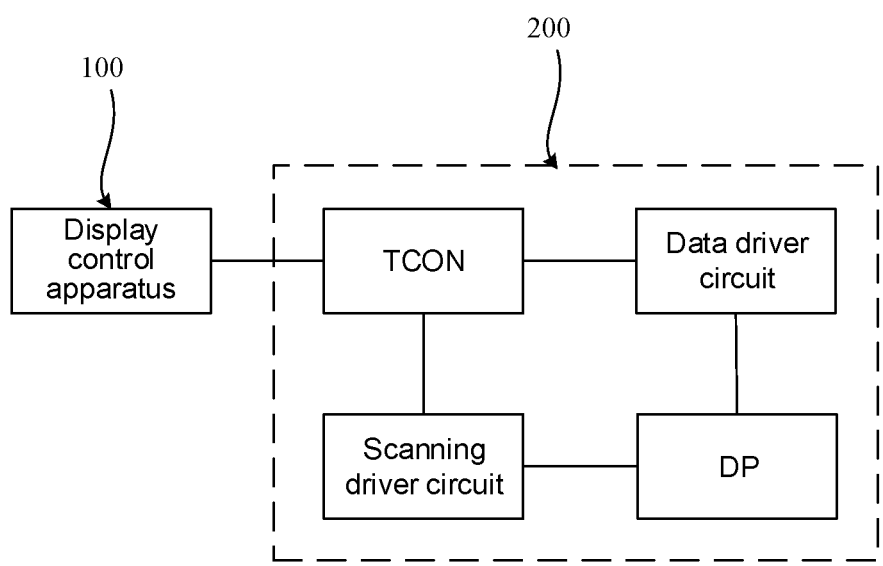
FIG. 2 is a structural diagram of a display apparatus, in accordance with some embodiments.

As shown in FIG. 2, the display apparatus may include a display module 200 and a display control apparatus 100 coupled to the display module. The display module 200 is configured to display an image (picture), and the display control apparatus 100 is configured to perform a display control method to output image data to the display module 200, so as to control the display module 200 to display images corresponding to the image data.

For example, as shown in FIG. 2, the display module 200 may include a timing controller (TCON), a data driver circuit (i.e., a source driver circuit), a scanning driver circuit and a display panel (DP, also referred to as a display screen).

The display panel may be an organic light-emitting diode (OLED) panel, a quantum dot light-emitting diode (QLED) panel, a liquid crystal display (LCD) panel, or a tiny LED (including a Mini LED or a Micro LED) panel.

For example, the display panel may include a plurality of sub-pixels. The number and distribution of the plurality of sub-pixels included in the display panel determine a resolution of the display panel, i.e., a resolution of the display module 200 or a resolution of the display apparatus. For example, the display panel includes M by N (i.e., M×N) physical pixels, and each physical pixel includes a red sub-pixel (an R sub-pixel), a green sub-pixel (a G sub-pixel) and a blue sub-pixel (a B sub-pixel). In this case, the resolution of the display panel is (M×N). For another example, the display panel includes ((M×N)/2) R sub-pixels, (M×N) G sub-pixels and ((M×N)/2) B sub-pixels, and these sub-pixels form (M×N) virtual pixels, which can display an image with a resolution of (M×N), and the R sub-pixel and the B sub-pixel may be shared by different virtual pixels. In this case, the resolution of the display panel is also (M×N). The resolution is generally expressed in a multiplicative form. For example, the resolution of the display panel may be (1920×1080), (4096×2160) or (8192×4320), which indicates that the display panel includes (1920×1080), (4096× 2160) or (8192×4320) physical or virtual pixels, respectively. The higher the resolution, the larger the number of pixels.

The TCON is used to convert received data signals (e.g., image data output from the display control apparatus 100) and received control signals respectively into data signals and control signals that are suitable for the data driver circuit and the scanning driver circuit, so as to realize image display of the display panel. Input interfaces of the TCON may include at least one of a transistor-transistor logic (TTL) interface, a low voltage differential signaling (LVDS) interface, an embedded display port (eDP) interface and a V-by-One interface. Accordingly, output interfaces of the display control apparatus 100 may include at least one of a TTL interface, a LVDS interface, an eDP interface and a V-by-One interface. In some implementations, the TCON may be integrated into the display control apparatus 100.

The data driver circuit may be a source driver chip, for example, a driver integrated circuit (IC). The data driver circuit is configured to provide, in response to the data signals (i.e., digital signals) and the control signals that are sent by the TCON, a driving signal (also referred to as a data driving signal, which may include a voltage or current corresponding to the digital signal) for each sub-pixel in the display panel. In some implementations, the data driver circuit may be integrated into the display control apparatus 100.

The scanning driver circuit may be a scanning driver chip, for example, a driver IC. The scanning driver circuit may be bonded to the display panel. Alternatively, the scanning driver circuit may be provided in the display panel, and in this case, it may be referred to as a gate driver on array (GOA, i.e., a scanning driver circuit disposed on an array substrate). The scanning driver circuit is configured to provide, in response to the control signals sent by the TCON, a scanning signal to each row of sub-pixels in the display panel.

In some embodiments, the display control apparatus 100 may be a chip system, which may include at least one chip and is configured to perform a display control method. The chip may be a programmable logic device. For example, the chip may be a field programmable gate array (FPGA) or a complex programmable logic device (CPLD). The chip may also be a system-on-a-chip (SoC) chip.

Figure 3A:
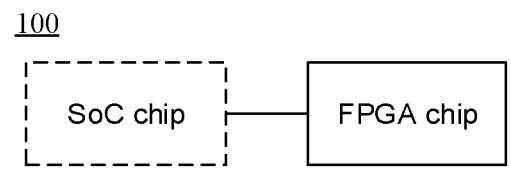
FIG. 3A is a structural diagram of a display control apparatus, in accordance with some embodiments.

For example, referring to FIG. 3A, the display control apparatus 100 is a chip system including a SoC chip and a FPGA chip, and is configured to perform the display control method. For example, the chip system may include a SoC board card including the SoC chip and a FPGA board card including the FPGA chip. For another example, the chip system may include a board card including the SoC chip and the FPGA chip.

For another example, the display control apparatus 100 is a chip system including a FPGA chip, and is configured to perform the display control method. For example, the chip system may be a FPGA board card including the FPGA chip.

Figure 3B:
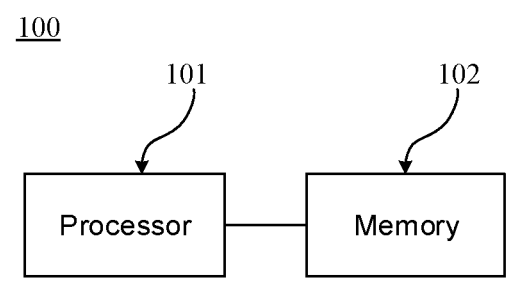
FIG. 3B is a structural diagram of another display control apparatus, in accordance with some embodiments.

In some other embodiments, referring to FIG. 3B, the display control apparatus 100 may include at least one processor 101 and at least one memory 102. The at least one memory 102 has stored computer program(s) therein, and the at least one processor 101 is configured to execute the computer program(s) store in the at least one memory 102, so that the display control apparatus 100 performs the display control method.

The memory 102 may include a high-speed random access memory, or may include a non-volatile memory such as a magnetic disk storage device or a flash memory device. Alternatively, the memory 102 may be a read-only memory (ROM) or a static storage device of any other types that may store static information and instructions, a random access memory (RAM) or a dynamic storage device of any other types that may store information and instructions. Alternatively, the memory 102 may be a one-time programmable (OTP) memory, an electrically erasable programmable read-only memory (EEPROM), a magnetic disk storage medium, a flash or any other magnetic storage device, or any other medium capable of carrying or storing program codes in the form of instructions or data structures and capable of being accessed by a computer, but the type of the memory is not limited thereto. The memory 102 may exist independently, and be connected to the processor 101 through a communication line. Alternatively, the memory 102 may be integrated with the processor 101.

The processor 101 is used to implement image processing, and may be one or more general-purpose central processing units (CPUs), microcontroller units (MCUs), logic devices, application-specific integrated circuits (ASICs), graphics processing units (GPUs), or integrated circuits (ICs) for controlling execution of programs in some embodiments of the present disclosure. The CPU may be a single-CPU or a multi-CPU. A processor here may refer to one or more devices, circuits or processing cores for processing data (e.g., computer program instructions).

Figure 4:
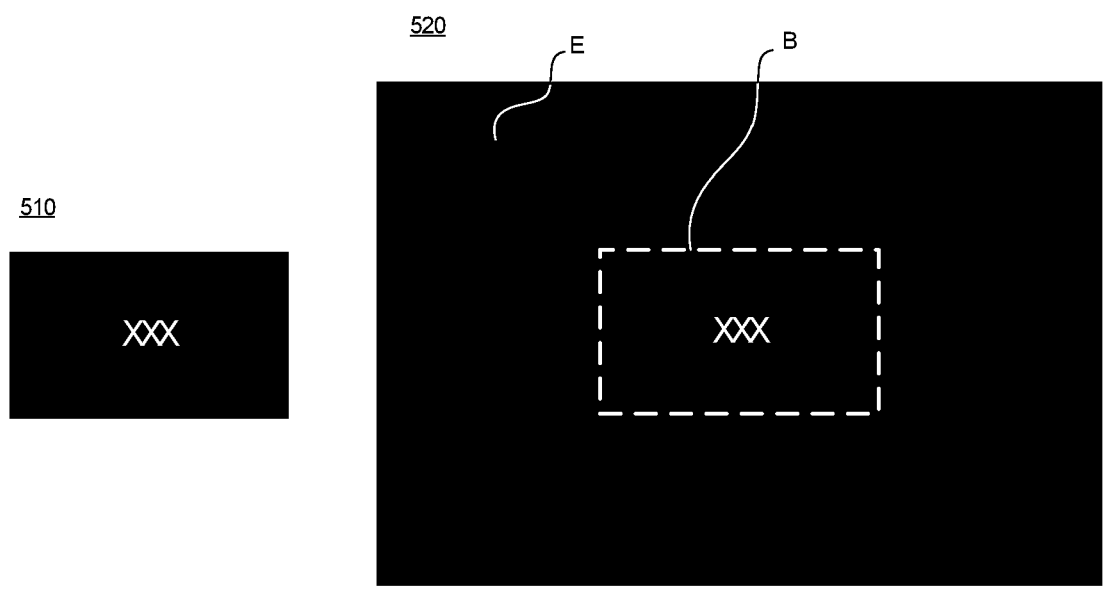
FIG. 4 is a schematic diagram of a first image and a second image, in accordance with some embodiments.

Based on the structure of the display apparatus described above, the embodiments of the present disclosure provide a display control method. Referring to FIG. 4, the display control method provided by the embodiments of the present disclosure may utilize image data of a startup picture with the low resolution (e.g., a first image 510) stored in the display apparatus to enable the display apparatus to display a startup picture with the high resolution (e.g., a second image 520). In this way, for a display apparatus with the high resolution, the image data of the startup picture with the low resolution may be stored in the display apparatus, which may solve problems of a large storage space occupied by the image data of the startup picture with the high resolution and a long loading time of the image data of the startup picture with the high resolution.

Figure 5:
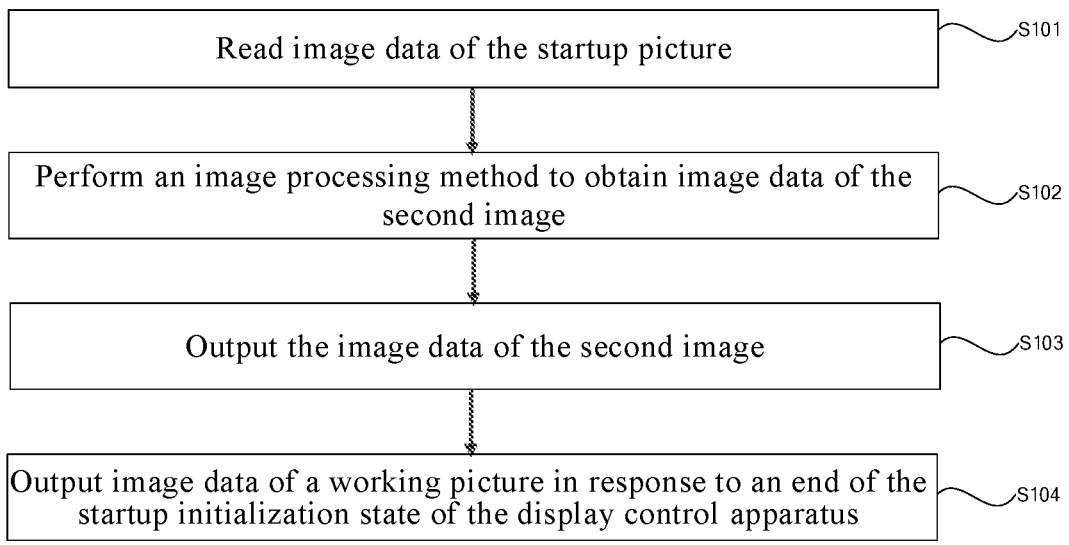
FIG. 5 is a flowchart of a display control method, in accordance with some embodiments.

FIG. 5 is a flowchart of the display control method provided by the embodiments of the present disclosure. Referring to FIGS. 4 and 5, the display control method includes S101 to S103.

In S101, image data of a startup picture are read.

For example, the image data of the startup picture are read in response to a case where the display control apparatus is powered on. For example, when the display apparatus is in a power-off state and is triggered to be started up, the display control apparatus in the display apparatus is powered on to perform the step of reading.

For another example, the image data of the startup picture are read in response to a received read instruction. For example, the read instruction may be sent to the display control apparatus by the host in the display apparatus.

The startup picture includes at least one frame of image. In a case where the startup picture includes one frame of image, it is static. In a case where the startup picture includes a plurality of frames of images, it is dynamic. Each frame of image may include a display content and a background. The display content of the startup picture may include a pattern (e.g., a logo), words (e.g., copyright information), and the like, and is generally centralized in the center or any other position of the startup picture. The background of the startup picture may be solid-colored. Alternatively, the background of the startup picture may be non-solid-colored, for example, gradually changed in color or irregular in color distribution. In some embodiments, the startup picture may include the first image 510 having a first resolution, and includes the display content "XXX" and the background. For example, the background is a solid black background.

Figure 6A:
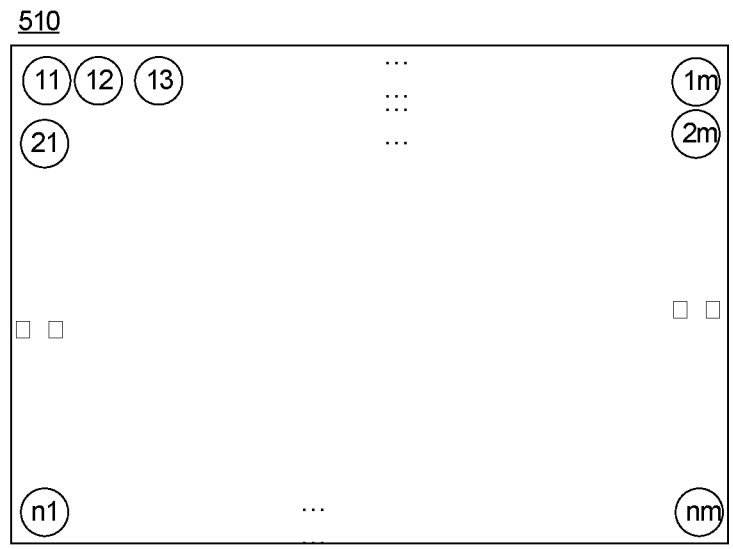
FIG. 6A is a schematic diagram of a first image, in accordance with some embodiments.

For example, FIG. 6A shows a schematic diagram of the first image 510. Referring to FIG. 6A, the first image 510 includes n rows by m columns of pixels, i.e., (m×n) pixels. A pixel in an x-th row and a y-th column may be denoted as a pixel xy, where a value of x is within a range from 1 to n, inclusive, and a value of y is within a range from 1 to m, inclusive. For example, the first image 510 may include pixels 11, 12, 13, . . . , 1m, 21, . . . , 2m, . . . , n1, . . . , nm.

The image data may include RGB image data, or may include YUV image data. The RGB image data may include a pixel value of at least one pixel, and the pixel value may include pixel data (e.g., grayscale data) of all sub-pixels in the pixel. For example, the pixel includes a red sub-pixel (an R sub-pixel), a green sub-pixel (a G sub-pixel) and a blue sub-pixel (a B sub-pixel), and the pixel value of the pixel may include grayscale data of the R sub-pixel, the G sub-pixel and the B sub-pixel, for example, R is equal to 255 (R=255), G is equal to 255 (G=255), and B is equal to 255 (B=255). When pixel values of two pixels are equal, the two pixels may display the same color. The pixel value has a certain range. For example, in a case where the display apparatus is an 8 bit display apparatus, a range of a pixel value in the image data is from 0 to 255, inclusive, that is, R is in a range of 0 to 255, inclusive (R=0~255), G is in a range of 0 to 255, inclusive (G=0~255) and B is in a range of 0 to 255, inclusive (B=0~255). In the display control method provided by the embodiments of the present disclosure, each pixel value obtained or generated is within the range of the pixel value. For example, for a certain pixel value, if a result obtained or generated is beyond the range of the pixel value, the pixel value takes a large boundary value of the range in a case where the result is greater than the range, and the pixel value takes a small boundary value of the range in a case where the result is less than the range. For example, the range of the pixel value is from 0 to 255, inclusive; in a case where the result obtained or generated is greater than 255, the pixel value is 255; and in a case where the result obtained or generated is less than 0, the pixel value is 0.

In S102, an image processing method is performed to obtain image data of a second image.

Referring to FIGS. 4 and 5, in some embodiments, through the step S102, the image data of the second image 520 may be obtained based on the image data of the first image 510. The second image 520 has a second resolution, and the second resolution is greater than the first resolution of the first image 510.

Referring to FIG. 4, the second image 520 has a base region B and an extended region E. In order to control the display panel to display the second image 520, the display control apparatus needs the image data corresponding to the second image 520, and the image data include pixel values of all pixels in the second image 520. Accordingly, the image data of the second image 520 may include image data of the base region B and image data of the extended region E. The image data of the base region B may include pixel values of all pixels in the base region B of the second image 520, and the image data of the extended region E may include pixel values of all pixels in the extended region E of the second image 520.

Figure 6B:
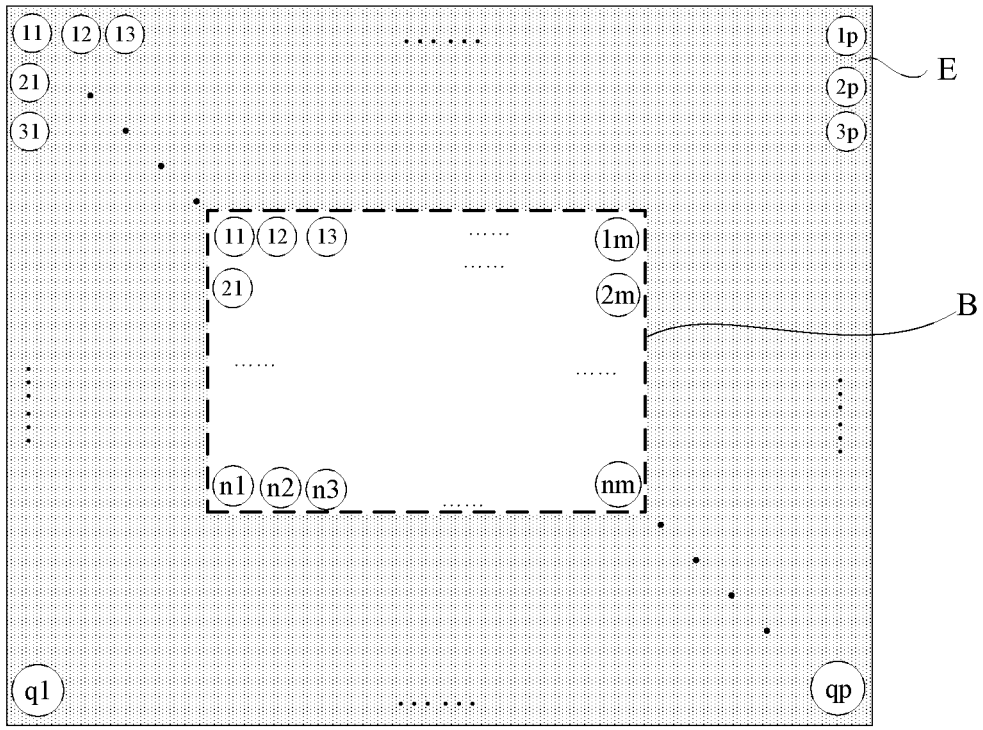
FIG. 6B is a schematic diagram of a second image, in accordance with some embodiments.

For example, FIG. 6B shows a structural diagram of the second image 520. Referring to FIG. 6B, the second image 520 has a second resolution, which is denoted as (p×q) (p is greater than or equal to 1 (p≥1), and q is greater than or equal to 1 (q≥1)). The second image 520 includes (p×q) pixels. A pixel in an x-th row and a y-th column may be denoted as a pixel xy, where a value of x is within a range from 1 to q, inclusive, and a value of y is within a range from 1 to p, inclusive. For example, the second image 520 may include pixels 11, 12, 13, . . . , 1p, 21, . . . , 2p, 31, . . . , 3p, . . . , q1, . . . , qp.

For example, the extended region E is an annular region, and the extended region E surrounds the base region B. The base region B may be in the middle of the second image 520. For example, the base region B and the second image 520 are both in a shape of a rectangle, and a center point of the base region B coincides with a center point of the second image 520.

In order to use the image data of a startup picture with a low-resolution to complete display of a startup picture with a high-resolution on a high-resolution display apparatus, the image data of the startup picture with the low-resolution may be used to fill an image corresponding to the startup picture with the low-resolution in a portion of a picture displayed on the display apparatus with the high-resolution. In addition, a corresponding background is filled in the other portion of the picture displayed on the display apparatus with the high-resolution, so that the picture displayed on the display apparatus with the high-resolution is a picture with a uniform color change on the whole.

Based on this, in some embodiments, referring to FIGS. 4 and 5, in step S102, the base region B of the second image 520 may be filled with an image corresponding to the first image 510 with the low-resolution, and the extended region E of the second image 520 may be filled with a corresponding solid black background. In this way, the startup picture with the high-resolution displayed on the display apparatus with the high-resolution includes all information of the startup picture with the low-resolution (e.g., the display content "XXX"), and the color change of the startup picture with the high-resolution is uniform, which may provide the user with a good visual effect.

In S103, the image data of the second image are output.

For example, the image data of the second image are output in response to a case where the display control apparatus is in a startup initialization state. For example, once the display control apparatus is powered on or when the display control apparatus receives a startup instruction signal, the image data of the second image are output to the TCON to control the display panel for display according to the image data of the second image (i.e., control the display panel to display the second image).

In some embodiments, the display control method further includes the following step.

In S104, image data of a working picture are output in response to an end of the startup initialization state of the display control apparatus.

For example, when receiving a startup state ending signal, the display control apparatus outputs the image data of the working picture to the TCON to control the display panel to display the working picture.

Figure 7:
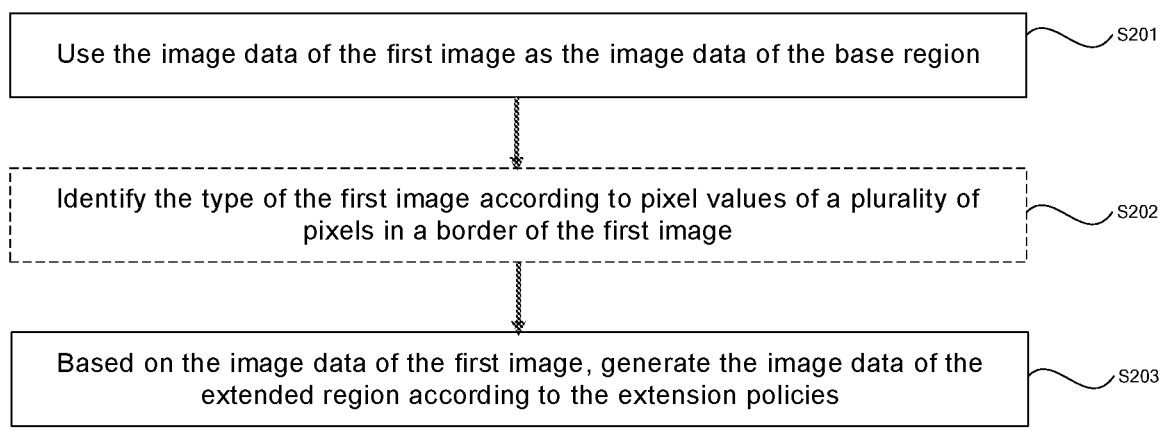
FIG. 7 is a flowchart of an image processing method, in accordance with some embodiments.

Some embodiments of the present disclosure further provide an image processing method. The image processing method may be configured to generate the image data of the second image as an implementation of the step S102. FIG. 7 is a flowchart illustrating steps of the image processing method provided by the embodiments of the present disclosure. Referring to FIG. 7, the image processing method includes S201 and S203.

In S201, the image data of the first image are used as the image data of the base region.

In some embodiments, referring to FIG. 4, the image data of the first image 510 are used as the image data of the base region B of the second image 520. For example, referring to FIGS. 6A and 6B, a portion of the second image 520 located at the base region B includes (m×n) pixels, and pixel values of the (m×n) pixels are respectively equal to the pixel values of the (m×n) pixels of the first image 510, so that the portion of the second image 520 located at the base region B is the first image 510.

In some embodiments, referring to FIG. 7, the image processing method further includes the following step.

In S202, the type of the first image is identified according to pixel values of a plurality of pixels in a border of the first image.

Based on the above description, in order to use the image data of the first image to make the display apparatus display the second image, the extended region of the second image may be filled with a background similar to the background of the first image. In this way, in a case where the extended region of the second image is stitched together with the base region, the color change of the second image may be uniform.

The first image may be classified as one of various types according to the background of the first image, and a corresponding policy of various extension policies is used to generate the image data of the extended region of the second image, so that the extended region of the second image has a corresponding background, and the color change of the second image may be uniform.

Since the extended region of the second image is directly stitched to the border of the first image, the first image may be classified as one of various types according to the border of the first image, and then the corresponding extension policy is selected. As a result, the uniform color change may be achieved in a case where the extended region of the second image is stitched together with the base region.

Figure 8:
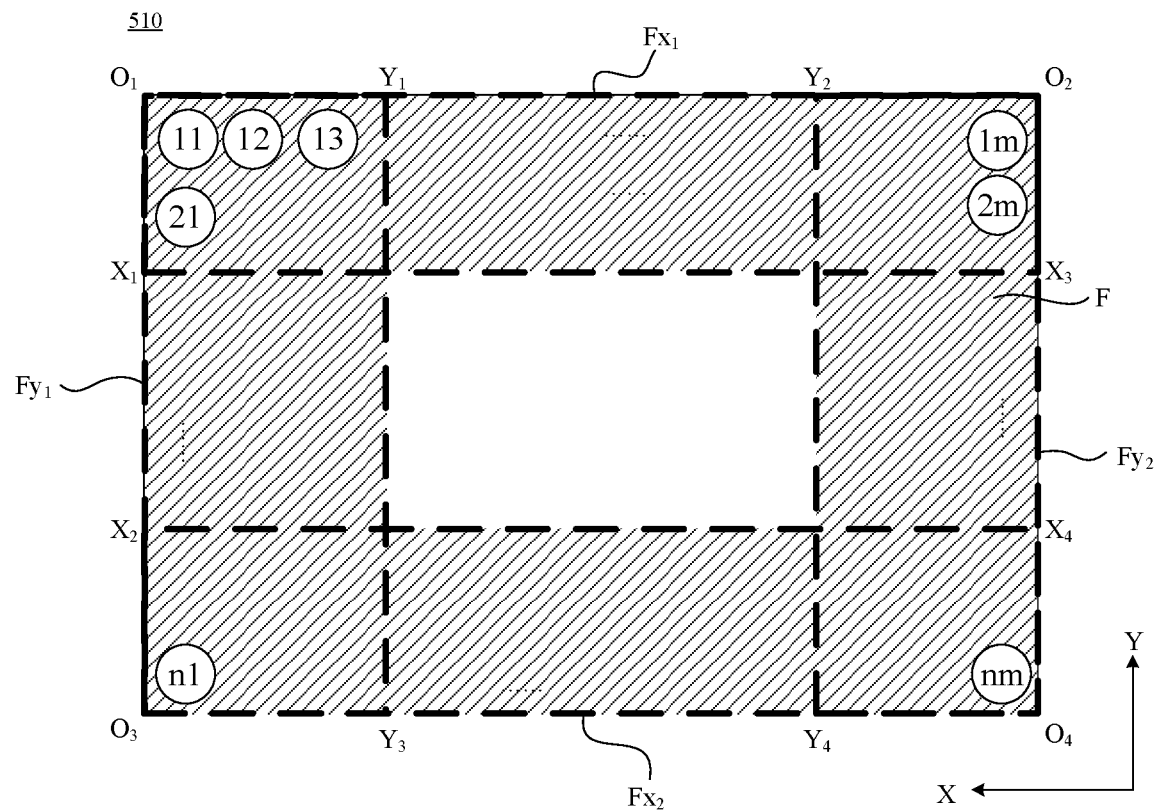
FIG. 8 is a schematic diagram of another first image, in accordance with some embodiments.

In some embodiments, referring to FIG. 8, the border F of the first image 510 includes two first sub-borders parallel to a row direction X, for example, a first sub-border $Fx_1$ (i.e., a portion $O_1O_2X_3X_1$) and a first sub-border $Fx_2$ (i.e., a portion $O_3O_4X_4X_2$). The border F of the first image 510 also includes two second sub-borders parallel to a column direction Y, for example, a second sub-border $Fy_1$ (i.e., a portion $O_1O_3Y_3Y_1$) and a second sub-border $Fy_2$ (i.e., a portion $O_2O_4Y_4Y_2$). The type of the first image can be determined according to a change trend of pixel values of pixels in each first sub-border in the row direction and a change trend of pixel values of pixels in each second sub-border in the column direction.

For example, a determination result of the first sub-border is determined according to the change trend of the pixel values of the pixels in each first sub-border in the row direction. The determination result of the first sub-border is denoted as a first determination result. For example, a determination result of the first sub-border $Fx_1$ is denoted as a first determination result 1, and a determination result of the first sub-border $Fx_2$ is denoted as a first determination result 2.

If pixel values of all pixels in each row of pixels in the first sub-border are approximately equal, the first determination result includes equality; otherwise, the first determination result includes inequality. For example, pixel values of all pixels in a row (e.g., an x-th row) of pixels in the first sub-border $Fx_1$ include $(R_{x1}, R_{x2}, R_{x3} \ldots R_{xn})$ $(B_{x1}, B_{x2}, B_{x3} \ldots B_{xn})$ $(G_{x1}, G_{x2}, G_{x3} \ldots G_{xn})$. If $R_{x1}=R_{x2}=R_{x3} \ldots =R_{xn}$, $B_{x1}=B_{x2}=B_{x3} \ldots =B_{xn}$, and $G_{x1}=G_{x2}=G_{x3} \ldots =G_{xn}$, it is indicated that the pixel values of the pixels in the x-th row are all equal. If a difference between any two of $(R_{x1}, R_{x2}, R_{x3} \ldots R_{xn})$, $(B_{x1}, B_{x2}, B_{x3} \ldots B_{xn})$ and $(G_{x1}, G_{x2}, G_{x3} \ldots G_{xn})$ is less than a set value (e.g., 1 or 2), that is, if a difference between any two of $R_{x1}$ to $R_{xn}$ is less than the set value, a difference between any two of $G_{x1}$ to $G_{xn}$ is less than the set value, and a difference between any two of $B_{x1}$ to $B_{xn}$ is less than the set value, the pixel values of the pixels in the x-th row are approximately equal. If the pixel values of the pixels in each row in the first sub-border $Fx_1$ are approximately equal, the first determination result 1 includes equality; otherwise, the first determination result 1 includes inequality.

If the pixel values of all the pixels in each row of pixels in the first sub-border gradually change, the first determination result includes gradual change; otherwise, the first determination result includes no gradual change. For example, the pixel values of all the pixels in an x-th row in the first sub-border $Fx_1$ include $(R_{x1}, R_{x2}, R_{x3} \ldots R_{xn})$ $(B_{x1}, B_{x2}, B_{x3} \ldots B_{xn})$ $(G_{x1}, G_{x2}, G_{x3} \ldots G_{xn})$, and a difference between pixel values of every two adjacent pixels in the x-th row is denoted as $\Delta R_{xy}=R_{xy}-R_{x(y-1)}$, $\Delta G_{xy}=G_{xy}-G_{x(y-1)}$, $\Delta B_{xy}=B_{xy}-B_{x(y-1)}$. For example, $\Delta R_{x2}=R_{x2}-R_{x1}$, $\Delta R_{x3}=R_{x3}-R_{x2}$, . . . , $\Delta R_{xn}=R_n-R_{(n-1)}$, $\Delta G_{x2}=G_{x2}-G_{x1}$, $\Delta G_{x3}=G_{x3}-G_{x2}$, . . . , $\Delta G_{xn}=G_n-G_{(n-1)}$, $\Delta B_{x2}=B_{x2}-B_{x1}$, $\Delta B_{x3}=B_{x3}-B_{x2}$, . . . , $\Delta B_{xn}=B_n-B_{(n-1)}$.

In some implementations, the first determination result includes inequality. In addition, if $\Delta R_{x2}=\Delta R_{x3}= \ldots =R_{xn}$, $\Delta G_{x2}=\Delta G_{x3}= \ldots =\Delta G_{xn}$, and $\Delta B_{x2}=\Delta B_{x3}= \ldots =\Delta B_{xn}$, it is indicated that the pixel values of the pixels in the x-th row gradually change. Alternatively, if a difference between any two of $\Delta R_{x2}$ to $\Delta R_{xn}$ is less than a set value (e.g., 1 or 2), a difference between any two of $\Delta G_{x2}$ to $\Delta G_{xn}$ is less than the set value, and a difference between any two of $\Delta B_{x2}$ to $\Delta B_{xn}$ is less than the set value, it is also indicated that the pixel values of the pixels in the x-th row gradually change.

In some other implementations, the first determination result includes inequality. In addition, in three groups of data $\Delta R_{x2}$ to $\Delta R_{xn}$, $\Delta G_{x2}$ to $\Delta G_{xn}$, and $\Delta B_{x2}$ to $\Delta B_{xn}$, if at least one group of data gradually increases or gradually decreases, and remaining groups of data are approximately equal, it is indicated that the pixel values of the pixels in the x-th row gradually change.

For example, the first determination result includes inequality, and if $\Delta R_{x2}$ to $\Delta R_{xn}$ gradually increase, $\Delta G_{x2}$ to $\Delta G_{xn}$ gradually increase, and $\Delta B_{x2}$ to $\Delta B_{xn}$ gradually increase, it is indicated that the pixel values of the pixels in the x-th row gradually change. Alternatively, the first determination result includes inequality, and if $\Delta R_{x2}$ to $\Delta R_{xn}$ gradually decrease, $\Delta G_{x2}$ to $\Delta G_{xn}$ gradually decrease, and $\Delta B_{x2}$ to $\Delta B_{xn}$ gradually decrease, it is indicated that the pixel values of the pixels in the x-th row gradually change.

For another example, the first determination result includes inequality, and if $\Delta R_{x2}$ to $\Delta R_{xn}$ gradually increase or gradually decrease, $\Delta G_{x2}$ to $\Delta G_{xn}$ are approximately equal, and $\Delta B_{x2}$ to $\Delta B_{xn}$ are approximately equal, it is indicated that the pixel values of the pixels in the x-th row gradually change.

If the pixel values of the pixels in each row in the first sub-border $Fx_1$ gradually change, the first determination result 1 includes gradual change; otherwise, the first determination result 1 includes no gradual change.

For example, a determination result of the second sub-border is determined according to the change trend of the pixel values of the pixels in each second sub-border in the column direction. The determination result of the second sub-border is denoted as a second determination result. For example, a determination result of the second sub-border $Fy_1$ is denoted as a second determination result 1, and a determination result of the second sub-border $Fy_2$ is denoted as a second determination result 2.

Similar to the first determination result of the first sub-border, if pixel values of all pixels in each column of pixels in the second sub-border are approximately equal, the second determination result includes equality; otherwise, the second determination result includes inequality. If the pixel values of all the pixels in each column of pixels in the second sub-border gradually change, the second determination result includes gradual change; otherwise, the second determination result includes no gradual change.

In some embodiments, if the first determination result of each first sub-border and the second determination result of each second sub-border both include equality, the first image is of the first type, and the first type may be configured to indicate that the first image includes a solid-colored border. For example, the first determination result 1 of the first sub-border $Fx_1$, the first determination result 2 of the first sub-border $Fx_2$, the second determination result 1 of the second sub-border $Fy_1$, and the second determination result 2 of the second sub-border $Fy_2$ are all include equality, the first image 510 is of the first type, and the first image 510 may include the solid-colored border.

If the first determination result of each first sub-border includes equality, and the second determination result of each second sub-border includes gradual change, the first image is of the second type, and the second type may be configured to indicate that the first image includes a border, a color of which gradually changes in the column direction and does not change in the row direction. For example, the first determination result 1 of the first sub-border $Fx_1$ and the first determination result 2 of the first sub-border $Fx_2$ both include equality, and the second determination result 1 of the second sub-border $Fy_1$ and the second determination result 2 of the second sub-border $Fy_2$ both include gradual change, the first image 510 is of the second type, and the first image 510 may include the border, a color of which gradually changes in the column direction and does not change in the row direction.

If the first determination result of each first sub-border includes gradual change and the second determination result of each second sub-border includes equality, the first image is of the third type, and the third type may be configured to indicate that the first image includes a border, a color of which gradually changes in the row direction and does not change in the column direction. For example, the first determination result 1 of the first sub-border $Fx_1$ and the first determination result 2 of the first sub-border $Fx_2$ both include gradual change, and the second determination result 1 of the second sub-border $Fy_1$ and the second determination result 2 of the second sub-border $Fy_2$ both include equality, the first image 510 is of the third type, and the first image 510 may include the border, a color of which gradually changes in the row direction and does not change in the column direction.

If the first determination result of each first sub-border and the second determination result of each second sub-border both include gradual change, the first image is of the fourth type, and the fourth type may be configured to indicate that the first image includes a border, a color of which gradually changes both in the row direction and in the column direction.

If at least one of the first determination result of each first sub-border and the second determination result of each second sub-border includes inequality and no gradual change, the first image is of the fifth type, and the fifth type may be configured to indicate that the first image includes a border that is irregular in color. For example, at least one of the first determination result 1 of the first sub-border $Fx_1$, the first determination result 2 of the first sub-border $Fx_2$, the second determination result 1 of the second sub-border $Fy_1$ and the second determination result 2 of the second sub-border $Fy_2$ includes inequality and no gradual change, the first image 510 is of the fifth type, and the first image 510 may include the border that is irregular in color.

In S203, based on the image data of the first image, the image data of the extended region are generated according to the extension policies.

After step S202, the first image may be classified as one of five types according to the border of the first image. With regard to different types, different extension policies may be used for the first image, so as to use the image data of the first image to generate the image data of the extended region of the second image.

In some embodiments, referring to FIG. 8, the image data of the extended region E may be generated according to the extension policies based on a pixel value of at least one pixel in the border F of the first image 510.

For example, referring to FIG. 8, the first image 510 has the border F. The border F includes 4 sub-borders, for example, the sub-borders $Fx_1$, $Fx_2$, $Fy_1$ and $Fy_2$. A width of each sub-border is greater than that of a single pixel, and the width of each sub-border may or may not be equal. For example, widths of all sub-borders are equal, and each sub-border includes a width of n pixels. In this case, the sub-border $Fx_1$ and the sub-border $Fx_2$ both include n rows of pixels, and the sub-border $Fy_1$ and the sub-border $Fy_2$ both include n columns of pixels. For example, n is greater than or equal to 1 and less than or equal to 10 ($1 \leq n \leq 10$). For example, n is equal to 5 (n=5), and in this case, the sub-border $Fx_1$ and the sub-border $Fx_2$ both include 5 rows of pixels, and the sub-border $Fy_1$ and the sub-border $Fy_2$ both include 5 columns of pixels. For another example, n is equal to 10 (n=10), and in this case, the sub-border $Fx_1$ and the sub-border $Fx_2$ both include 10 rows of pixels, and the sub-border $Fy_1$ and the sub-border $Fy_2$ both include 10 columns of pixels.

Figure 9A:
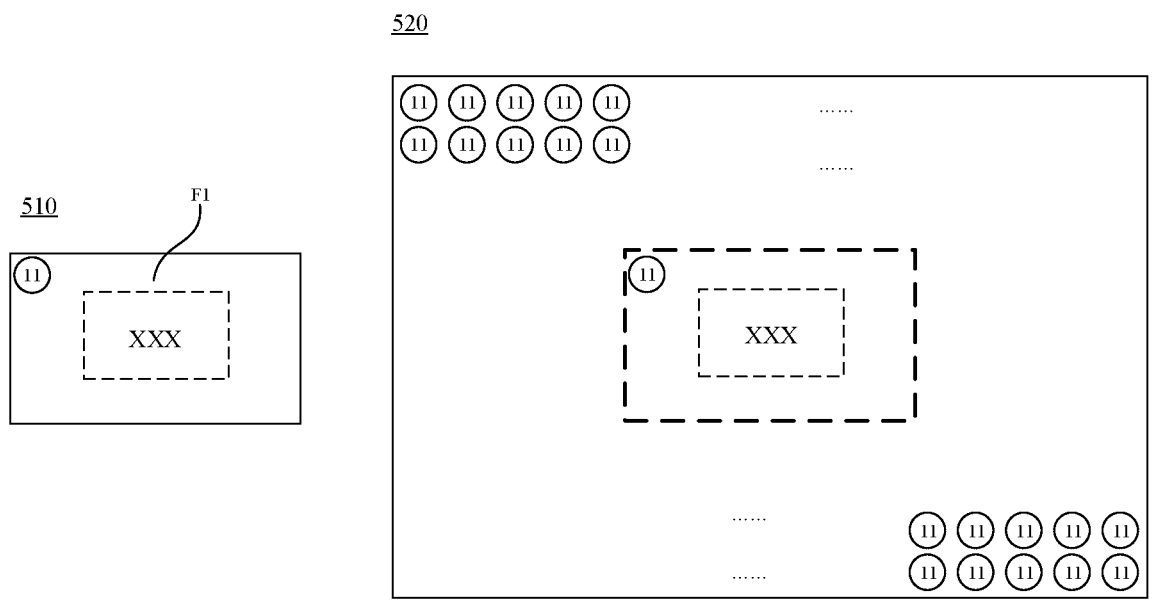
FIG. 9A is a schematic diagram of another first image and another second image, in accordance with some embodiments.

In some embodiments, referring to FIG. 9A, the first image 510 includes a solid-colored border F1. The solid-colored border F1 means that a color of the border F1 is a single color. In this case, all pixels in the border F1 of the first image 510 may have the same pixel value.

In this case, a pixel value of a pixel in the border F1 of the first image 510 may be used as a pixel value of each pixel in the extended region E.

The border F1 of the first image 510 is solid-colored, and the pixel values of all the pixels in the border F1 are equal. Therefore, by using a pixel value of any pixel in the solid-colored border F1 as the pixel value of each pixel in the extended region E, it may be realized that a color of the extended region E is the same as the color of the border F1 of the first image 510. Moreover, since the base region B of the second image 520 may be filled with the first image 510 after step S201, the base region B of the second image 520 also has a solid-colored border. In this case, the color of the extended region E is the same as the color of the border of the base region B. In this way, in a case where the extended region E and the base region B are connected together to form the second image 520, the second image 520 has a solid-colored background, and a uniform color change. For example, referring to FIG. 9A, a pixel value of a pixel 11 in the border F1 of the first image 510 is used as the pixel value of each pixel in the extended region E.

In some embodiments, the first image includes a non-solid-colored border. The non-solid-colored border means that the border has a plurality of colors. In this case, each pixel in the border of the first image may have a different pixel value. For example, the non-solid-colored border may include a border, a color of which gradually changes in the row direction and/or in the column direction. A gradual change in color means that a color gradually changes in a certain direction, for example, the color gradually becomes darker or lighter in the certain direction. The change may be uniform or non-uniform. In a case where the color of an image changes gradually, a color displayed by all pixels in the image changes gradually, and correspondingly, pixel values of all the pixels in the image also changes gradually.

In this case, the image data of the extended region may be generated, based on pixel values of a plurality of (e.g., z, z is greater than or equal to 2 ($z \geq 2$)) pixels in the border of the first image, according to the extension policies.

Figure 9B:
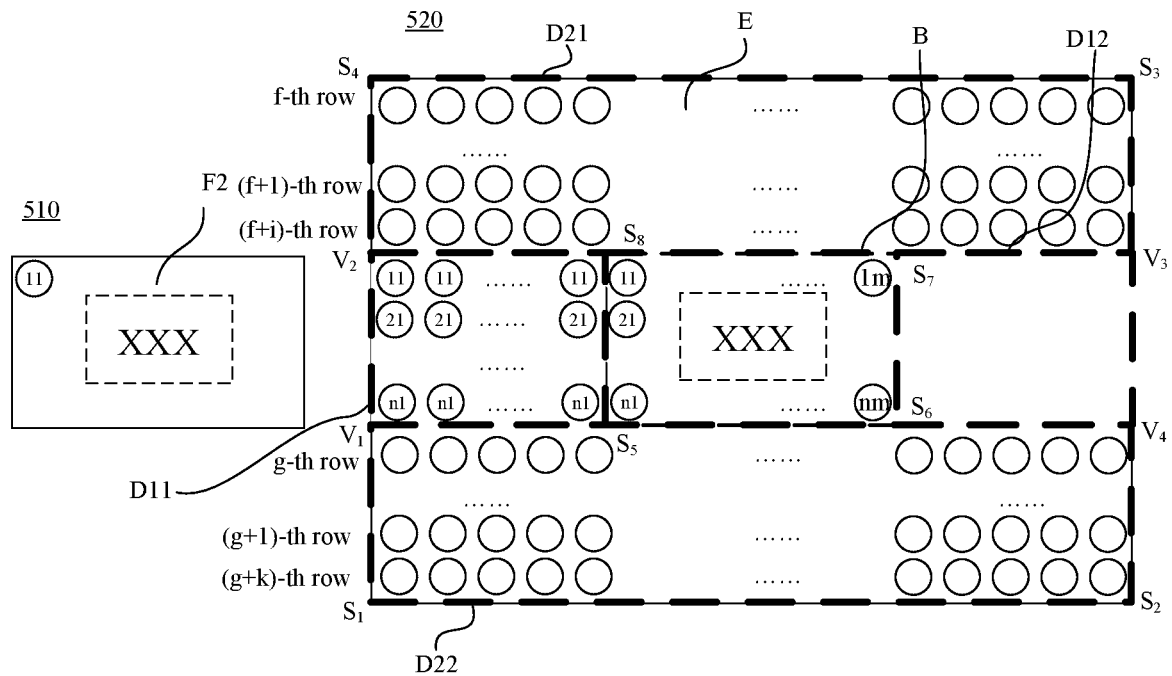
FIG. 9B is a schematic diagram of yet another first image and yet another second image, in accordance with some embodiments.

In an implementation of this embodiment, referring to FIG. 9B, the first image 510 includes a border F2, a color of which gradually changes in the column direction and does not change in the row direction. For example, the color of border F2 gradually becomes darker in the column direction, and accordingly, pixel values of all pixels in the border F2 show a trend of gradually increasing in the column direction. Change of the pixel values of all the pixels in the border F2 in the column direction may be a uniform change, for example, these pixel values are in an arithmetic progression. Alternatively, the change of the pixel values of all the pixels in the border F2 in the column direction may be a non-uniform change. In addition, the color of the border F2 does not change in the row direction, and accordingly, pixel values of all pixels in the border F2 are approximately equal in the row direction.

The extended region E of the second image 520 shown in FIG. 9B includes a first sub-region D11 (i.e., a portion $V_1V_2S_8S_5$), a first sub-region D12 (i.e., a portion $V_3V_4S_6S_7$), and also includes a second sub-region D21 (i.e., a portion $S_4S_3V_3V_2$) and a second sub-region D22 (i.e., a portion $S_1S_2V_4V_1$) except the first sub-regions. The first sub-region D11 and the first sub-region D12 are both flush with the base region B in the row direction. In this case, each row of pixels in the first sub-region D11 and the first sub-region D12 may be flush with a corresponding row of pixels in the base region B.

In this case, according to a pixel value of at least one pixel, located at the border F2, in each row of pixels of the first image 510, a pixel value of each pixel in a corresponding row of pixels in the first sub-regions may be generated; and according to a change trend of pixel values of a plurality of pixels in the border F2 of the first image 510 in the column direction, pixel values of a plurality of rows of pixels that change in the column direction in the second sub-regions are obtained. Each row of pixels have the same pixel value, and each pixel value is within the range of the pixel value.

Hereinafter, methods for generating image data of the first sub-region and the second sub-region will be described respectively.

With regard to the first sub-region, referring to FIG. 9B, the first sub-region D11 is considered as an example for illustration. The image data of the first sub-region D12 may be generated by using a method similar to a method for generating the image data of the first sub-region D11, and details will not be provided herein. For each row of pixels in the first sub-region D11, a pixel value of each pixel in a row of pixels in the first sub-region D11 may be generated according to a pixel value of at least one pixel located at the border F2 in a corresponding row of pixels of the first image 510. For example, for a first row of pixels in the first sub-region D11, pixels located at the border F2 in the corresponding row of pixels of the first image 510 (i.e., the first row of pixels of the first image 510) filled in the base region B may be a pixel 11, a pixel 12, . . . , and a pixel 1m in the first row of the first image 510, and according to a pixel value of at least one pixel in these pixels, a pixel value of each pixel in the first row of pixels in the first sub-region D11 may be generated.

For example, a pixel value of a pixel, located at the border F2, in each row of pixels of the first image 510 is used as the pixel value of each pixel in the corresponding row of pixels in the first sub-region D11. For example, for the first row of pixels in the first sub-region D11, in the corresponding row of pixels of the first image 510 (i.e., the first row of pixels of the first image 510) filled in the base region B, a pixel value of a pixel (i.e., the pixel 11) located at the border F2 is used as the pixel value of each pixel in the first row of pixels in the first sub-region D11. Since the color of the border F2 of the first image 510 does not change in the row direction, pixel values of all pixels in each row of the border F2 of the first image 510 are approximately equal. In this case, a pixel value of any pixel located at the border F2 in each row of pixels of the first image 510 is used as the pixel value of each pixel in the corresponding row of pixels in the first sub-region D11, so that each row of pixels in the first sub-region D11 displays substantially the same color as a corresponding row of pixels in the border F2 of the first image 510. In this way, a color change in the second image 520 from the first image 510 filled in the base region B to the corresponding background filled in the first sub-region D11 may be uniform.

With regard to the second sub-region, referring to FIG. 9B, the second sub-region D21 is considered as an example for illustration. The second sub-region D21 includes (i+1) rows of pixels, where i is greater than or equal to 0 (i≥0). A respective one of these rows of pixels may be denoted as an (f+x)-th row of pixels, and a value of x is within a range from 0 to i, such as an f-th row of pixels, an (f+1)-th row of pixels, . . . , an (f+i)-th row of pixels shown in FIG. 9B. Since the color of the border F2 of the first image 510 gradually changes in the column direction, the pixel values of the plurality of pixels in the border F2 of the first image 510 have a certain change trend in the column direction. For example, the pixel values of all pixels in the border F2 of the first image 510 gradually increase or decrease in the column direction. Image data of the second sub-region D21 may be generated according to the change trend of the pixel values of the plurality of pixels in the border F2 in the column direction, so that a change trend of pixel values of all pixels in the second sub-region D21 in the column direction is the same as the change trend of the pixel values of the plurality of pixels in the border F2 of the first image 510 in the column direction. For example, according to a change trend of a pixel value (including $R_{11}$, $G_{11}$ and $B_{11}$) of the pixel 11 and a pixel value (including $R_{21}$, $G_{21}$ and $B_{21}$) of a pixel 21, pixel values of a plurality of rows of pixels that change in the column direction in the second sub-region D21 may be obtained based on a pixel value of any pixel (e.g., the pixel value of the pixel 11) in the first row of pixels of the first image 510. For example, in the obtained image data of the second sub-region D21, the pixel values of all pixels in each row of pixels may be equal. For example, in the obtained image data of the second sub-region D21, pixel values of a column of pixels may form an arithmetic progression, so that a color of the second sub-region D21 changes uniformly in the column direction, which may provide the user with a good viewing feeling. For example, in the obtained image data of the second sub-region D21, the pixel values of all pixels in the column of pixels are different from one other, and all the pixel values form the arithmetic progression. For example, in the y-th column, from the f-th row to the (f+i)-th row, pixel values of $R_{fy}$ to $R_{(f+i)y}$ are 10, 15, 20, . . . , respectively ($R_{fy}$~$R_{(f+i)y}$=10, 15, 20, . . . ); pixel values of $G_{fy}$ to $G_{(f+i)y}$ are 15, 20, 25, . . . , respectively ($G_{fy}$~$G_{(f+i)y}$=15, 20, 25, . . . ); and pixel values of $B_{fy}$ to $B_{(f+i)y}$ are 3, 6, 9, . . . , respectively ($B_{fy}$~$B_{(f+i)y}$=3, 6, 9, . . . ). For another example, in the obtained image data of the second sub-region D21, pixel values of adjacent pixels in the column of pixels may be equal, and non-repeated values in pixel values of all pixels in the column may form the arithmetic progression. For example, in the y-th column, from the f-th row to the (f+i)-th row, the pixel values of $R_{fy}$ to $R_{(f+i)y}$ are 10, 10, 20, 20, 30, 30, . . . , respectively ($R_{fy}$~$R_{(f+i)y}$=10, 10, 20, 20, 30, 30, . . . ); the pixel values of $G_{fy}$ to $G_{(f+i)y}$ are 15, 15, 20, 20, 25, 25, . . . , respectively ($G_{fy}$–$G_{(f+i)y}$=15, 15, 20, 20, 25, 25, . . . ); and the pixel values of $B_{fy}$ to $B_{(f+i)y}$ are 3, 3, 6, 6, 9, 9, . . . , respectively ($B_{fy}$~$B_{(f+i)y}$=3, 3, 6, 6, 9, 9, . . . ). For example, a method for obtaining the image data of the second sub-region D21 is as follows. The pixel value of the (f+x)-th row of pixels in the second sub-region D21 can be obtained according to:

$$R_{(f+x)} = R_{11} + x \times (R_{11} - R_{21});$$

$$G_{(f+x)} = G_{11} + x \times (G_{11} - G_{21}); \text{ and}$$

$$B_{(f+x)} = B_{11} + x \times (B_{11} - B_{21}).$$

Similarly, the second sub-region D22 may include (k+1) rows of pixels, where k is greater than or equal to 0 (k≥0). A respective one of these rows of pixels may be denoted as a (g+x)-th row of pixels, and a value of x is within a range from 0 to k, such as a g-th row of pixels, a (g+1)-th row of pixels, . . . , a (g+k)-th row of pixels shown in FIG. 9B. A method for obtaining image data of the second sub-region D22 is similar to the method for obtaining the image data of the second sub-region D21. For example, according to the change trend of the pixel value (including $R_{11}$, $G_{11}$ and $B_{11}$) of the pixel 11 and the pixel value (including $R_{21}$, $G_{21}$ and $B_{21}$) of the pixel 21 of the first image 510, pixel values of a plurality of rows of pixels that change in the column direction in the second sub-region D22 are obtained based on a pixel value of any pixel (e.g., a pixel value (including $R_{n1}$, $G_{n1}$ and $B_{n1}$) of a pixel n1) in an n-th row of pixels of the first image 510. For example, the method for obtaining the image data of the second sub-region D22 is as follows. The pixel value of the (g+x)-th row of pixels in the second sub-region D22 can be obtained according to:

$$R_{(g+x)} = R_{n1} - x \times (R_{11} - R_{21});$$

$$G_{(g+x)} = G_{n1} - x \times (G_{11} - G_{21}); \text{ and}$$

$$B_{(g+x)} = B_{n1} - x \times (B_{11} - B_{21}).$$

Figure 9C:
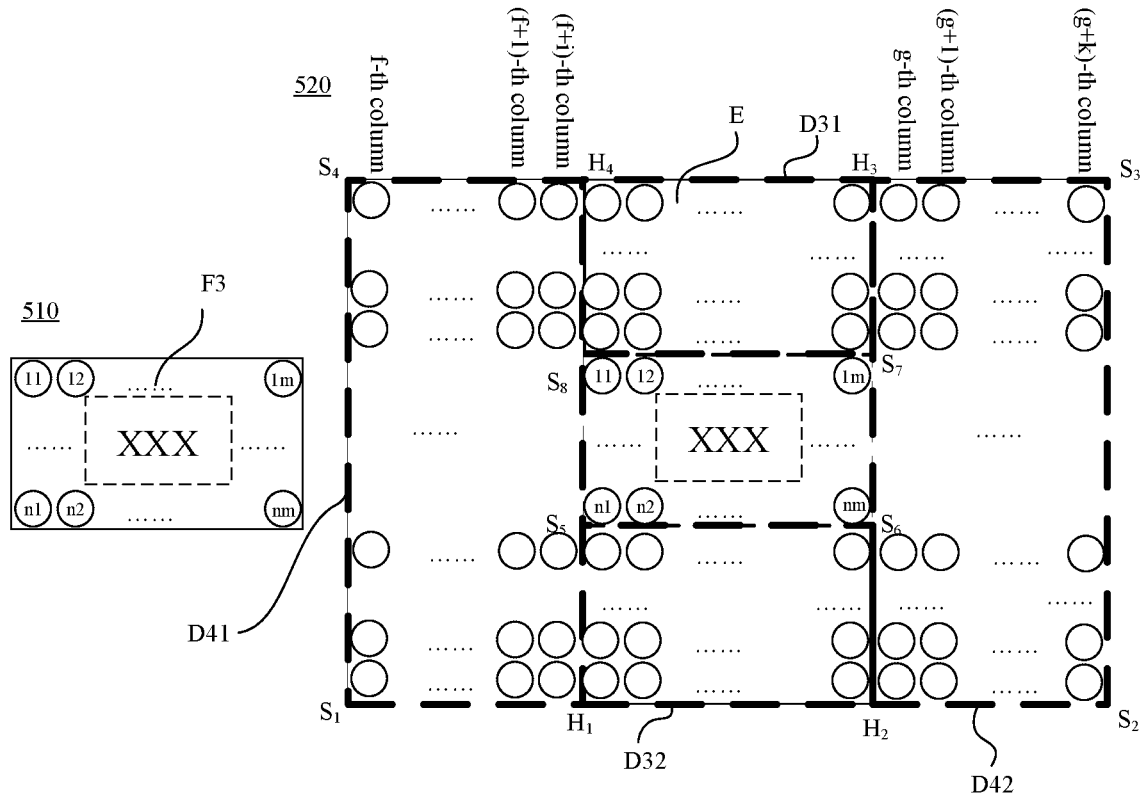
FIG. 9C is a schematic diagram of yet another first image and yet another second image, in accordance with some embodiments.

In an implementation of this embodiment, referring to FIG. 9C, the first image 510 includes a border F3, a color of which gradually changes in the row direction and does not change in the column direction. For example, the color of the border F3 gradually becomes darker in the row direction, and accordingly, pixel values of all pixels in the border F3 may show a trend of gradually increasing in the row direction. Change of the pixel values of all the pixels in the border F3 in the row direction may be a uniform change, for example, these pixel values are in an arithmetic progression. Alternatively, the change of the pixel values of all the pixels in the border F3 in the row direction may be a non-uniform change.

The extended region E of the second image 520 shown in FIG. 9C includes third sub-regions and fourth sub-regions except the third sub-regions. The third sub-regions are flush with the base region B in the column direction. For example, the second image 520 includes a third sub-region D31 (i.e., a portion $H_4H_3S_7S_8$), a third sub-region D32 (i.e., a portion $H_1H_2S_6S_5$), a fourth sub-region D41 (i.e., a portion $S_4S_1H_1H_4$) and a fourth sub-region D42 (i.e., a portion $S_3S_2H_2H_3$). The third sub-region D31 and the third sub-region D32 are both flush with the base region B in the column direction. In this case, each column of pixels in the third sub-region D31 and the third sub-region D32 may be flush with a corresponding column of pixels in the base region B.

In this case, according to a pixel value of at least one pixel, located at the border F3, in each column of pixels of the first image 510, a pixel value of each pixel in a corresponding column of pixels in the third sub-regions may be generated, and according to a change trend of pixel values of a plurality of pixels in the border F3 of the first image 510 in the row direction, pixel values of a plurality of columns of pixels that change in the row direction in the fourth sub-regions are obtained. Each column of pixels have the same pixel value, and each pixel value is within the range of the pixel value.

Hereinafter, methods for generating image data of the third sub-region and the fourth sub-region will be described respectively.

With regard to the third sub-region, referring to FIG. 9C, the third sub-region D31 is considered as an example for illustration. The image data of the third sub-region D32 may be generated by using a method similar to a method for generating the image data of the third sub-region D31, and details will not be provided herein. For each column of pixels in the third sub-region D31, a pixel value of each pixel in the column of pixels in the third sub-region D31 may be generated according to a pixel value of at least one pixel located at the border F3 in a corresponding column of pixels of the first image 510. For a first column of pixels in the third sub-region D31, pixels located at the border F3 in a corresponding column of pixels of the first image 510 (i.e., the first column of pixels of the first image 510) filled in the base region B may be the first column of pixels of the first image 510, including a pixel 11, a pixel 21, . . . , a pixel n1, and according to a pixel value of at least one pixel in these pixels, a pixel value of each pixel in the first column of pixels in the third sub-region D31 may be generated.

For example, a pixel value of a pixel, located at the border F3, in each column of pixels of the first image 510 is used as the pixel value of each pixel in the corresponding column of pixels in the third sub-region D31. For example, for the first column of pixels in the third sub-region D31, in the corresponding column of pixels of the first image 510 (i.e., the first column of pixels of the first image 510) filled in the base region B, a pixel value of a pixel (i.e., the pixel 11) located at the border F3 is used as the pixel value of each pixel in the first column of pixels in the third sub-region D31. Since the color of the border F3 of the first image 510 does not change in the column direction, pixel values of all pixels in each column of the border F3 of the first image 510 are approximately equal. In this case, a pixel value of any pixel located at the border F3 in each column of pixels of the first image 510 is used as the pixel value of each pixel in the corresponding column of pixels in the third sub-region D31, so that each column of pixels in the third sub-region D31 displays substantially the same color as a corresponding column of pixels in the border F3 of the first image 510. In this way, a color change from the first image 510 filled in the base region B to the third sub-region D31 of the second image 520 may be uniform.

With regard to the fourth sub-region, referring to FIG. 9C, the fourth sub-region D41 includes (i+1) columns of pixels, where i is greater than or equal to 0 (i≥0). A respective one of these columns of pixels may be denoted as an (f+x)-th column of pixels, and a value of x is within a range from 1 to i, such as an f-th column of pixels, an (f+1)-th column of pixels, . . . , and an (f+i)-th column of pixels shown in FIG. 9C. Since the color of the border F3 of the first image 510 gradually changes in the row direction, the pixel values of the plurality of pixels in the border F3 of the first image 510 have a certain change trend in the row direction. For example, the pixel values of all pixels in the border F3 of the first image 510 gradually increase or decrease in the row direction. Image data of the fourth sub-region D41 may be generated according to the change trend of the pixel values of the plurality of pixels in the border F3 in the row direction, so that a change trend of pixel values of all pixels in the fourth sub-region D41 in the row direction is the same as the change trend of the pixel values of the plurality of pixels in the border F3 of the first image 510 in the row direction. For example, according to a change trend of the pixel value (including $R_{11}$, $G_{11}$ and $B_{11}$) of the pixel 11 and a pixel value (including $R_{12}$, $G_{12}$ and $B_{12}$) of a pixel 12 in the row direction, pixel values of a plurality of columns of pixels that change in the row direction in the fourth sub-region D41 may be obtained based on a pixel value of any pixel (e.g., the pixel value of the pixel 11) in the first column of pixels of the first image 510. For example, in the obtained image data of the fourth sub-region D41, the pixel values of all pixels in each column of pixels may be equal. For example, in the obtained image data of the fourth sub-region D41, pixel values of a row of pixels may form an arithmetic progression, so that a color of the fourth sub-region D41 changes uniformly in the row direction, which may provide the user with a good viewing feeling. For example, in the obtained image data of the fourth sub-region D41, the pixel values of all pixels in the row of pixels are different from one other, and all the pixel values form the arithmetic progression. For another example, in the obtained image data of the fourth sub-region D41, pixel values of adjacent pixels in the row of pixels may be equal, and non-repeated values in pixel values of all pixels in the row may form the arithmetic progression. For example, a method for obtaining the image data of the fourth sub-region D41 is as follows. The pixel value of the (f+x)-th column of pixels in the fourth sub-region D41 can be obtained according to:

$R_{(f+x)}=R_{11}+x\times(R_{11}-R_{12})$;

$G_{(f+x)}=G_{11}+x\times(G_{11}-G_{12})$; and $B_{(f+x)}=B_{11}+x\times(B_{11}-B_{12})$.

Similarly, the fourth sub-region D42 may include (k+1) columns of pixels, where k is greater than or equal to 0 (k≥0). A respective one of these columns of pixels may be denoted as a (g+x)-th column of pixels, and a value of x is within a range from 0 to k, such as a g-th column of pixels, a (g+1)-th column of pixels, ..., a (g+k)-th column of pixels shown in FIG. 9C. A method for obtaining the image data of the fourth sub-region D42 is similar to the method for obtaining the image data of the fourth sub-region D41. For example, according to the change trend of the pixel value (including $R_{11}$, $G_{11}$ and $B_{11}$) of the pixel 11 and the pixel value (including $R_{12}$, $G_{12}$ and $B_{12}$) of the pixel 12 of the first image 510, pixel values of a plurality of columns of pixels that change in the row direction in the fourth sub-region D42 are obtained based on a pixel value of any pixel (e.g., a pixel value (including $R_{1m}$, $G_{1m}$ and $B_{1m}$) of a pixel 1m) in an m-th column of pixels of the first image 510. For example, the method for obtaining the image data of the fourth sub-region D42 is as follows. The pixel value of the (g+x)-th column of pixels in the fourth sub-region D42 can be obtained according to:

$R_{(g+x)}=R_{1m}-x\times(R_{11}-R_{12})$;

$G_{(g+x)}=G_{1m}-x\times(G_{11}-G_{12})$; and $B_{(g+x)}=B_{1m}-x\times(B_{11}-B_{12})$.

Figure 9D:
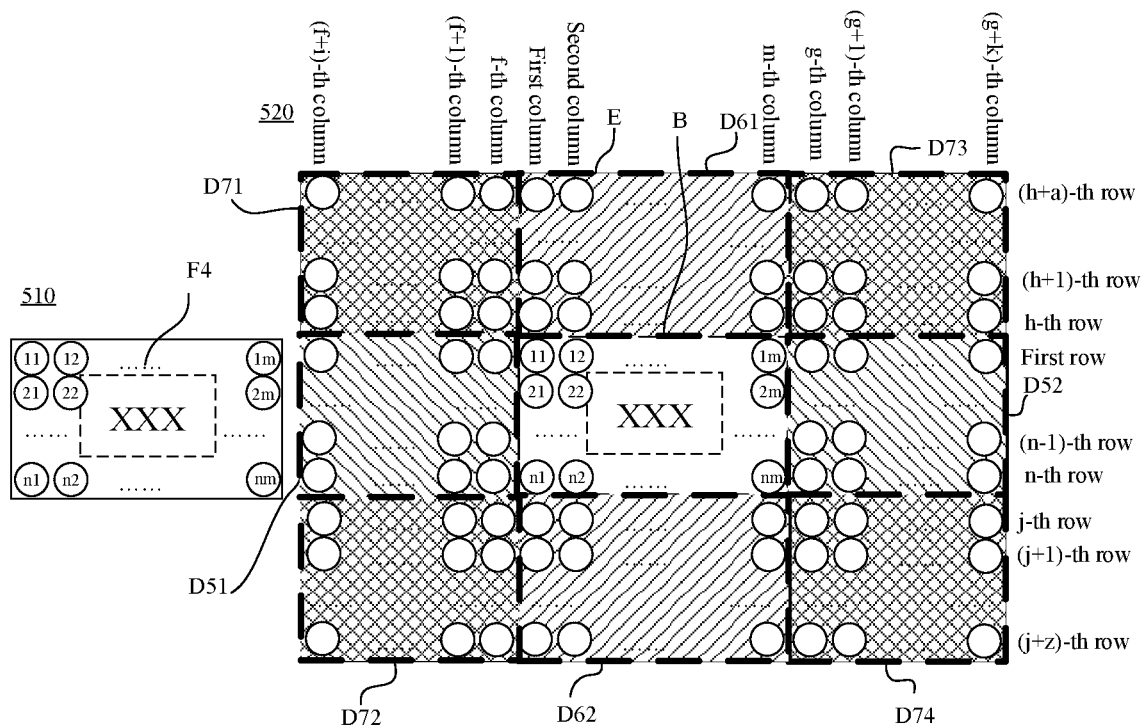
FIG. 9D is a schematic diagram of yet another first image and yet another second image, in accordance with some embodiments.

In an implementation of this embodiment, referring to FIG. 9D, the first image 510 includes a border F4, a color of which gradually changes both in the column direction and in the row direction. For example, the color of the border F4 gradually becomes darker in the row direction and/or the column direction, and accordingly, pixel value of all pixels in the border F4 may show a trend of gradually increasing in the row direction and/or the column direction. In addition, change of the pixel values of all the pixels in the border F4 in the row direction and/or the column direction may be a uniform change, for example, these pixel values are in an arithmetic progression. Alternatively, the change of the pixel values of all the pixels in the border F4 in the row direction and/or the column direction may be a non-uniform change.

The extended region E of the second image 520 shown in FIG. 9D includes fifth sub-regions, sixth sub-regions, and seventh sub-regions except the fifth sub-regions and the sixth sub-regions. The fifth sub-regions are flush with the base region B in the row direction, and the sixth sub-regions are flush with the base region B in the column direction. For example, the second image 520 includes a fifth sub-region D51, a fifth sub-region D52, a sixth sub-region D61, a sixth sub-region D62, and a seventh sub-region D71, a seventh sub-region D72, a seventh sub-region D73 and a seventh sub-region D74. The fifth sub-region D51 and the fifth sub-region D52 are both flush with the base region B in the row direction, and in this case, each row of pixels in the fifth sub-region D51 and the fifth sub-region D52 may be flush with a corresponding row of pixels in the base region B. The sixth sub-region D61 and the sixth sub-region D62 are both flush with the base region B in the column direction, and in this case, each column of pixels in the sixth sub-region D61 and the sixth sub-region D62 may be flush with a corresponding column of pixels in the base region B.

In this case, according to a change trend of pixel values of a plurality of pixels located in a row in the border F4 of the first image 510 in the row direction, pixel values of a corresponding row of pixels in the fifth sub-regions are obtained. Each pixel value is within the range of the pixel value. As a result, the image data of the fifth sub-regions can be obtained.

According to a change trend of pixel values of a plurality of pixels located in a column in the border F4 of the first image 510 in the column direction, pixel values of a corresponding column of pixels in the sixth sub-regions are obtained. Each pixel value is within the range of the pixel value. As a result, the image data of the sixth sub-regions can be obtained.

Image data of the seventh sub-regions are obtained based on the image data of the fifth sub-regions and/or the image data of the sixth sub-regions.

Hereinafter, methods for generating image data of the fifth sub-region, the sixth sub-region and the seventh sub-region will be described respectively.

With regard to the fifth sub-region, referring to FIG. 9D, the fifth sub-region D51 includes n rows and (f+i) columns of pixels, and the fifth sub-region D51 may include a pixel xy which represents a pixel in an x-th row and a y-th column, where a value of x is within a range from 1 to n, and a value of y is within a range from f to (f+i). Since the color of the border F4 of the first image 510 gradually changes both in the row direction and in the column direction, pixel values of a plurality of pixels located in a row in the border F4 of the first image 510 have a certain change trend in the row direction, and pixel values of a corresponding row of pixels in the fifth sub-region D51 may be obtained according to this change trend. As a result, the change trend of the pixel values of all pixels in the corresponding row of pixels in the fifth sub-region D51 in the row direction is the same as a change trend of pixel values of the row of pixels in the border F4 of the first image 510 in the row direction. For example, for the x-th row of pixels in the fifth sub-region D51, according to a change trend of a pixel value (including $R_{x1}$, $G_{x1}$ and $B_{x1}$) of a pixel x1 and a pixel value (including $R_{x2}$, $G_{x2}$ and $B_{x2}$) of a pixel x2 of the first image 510 in the row direction, pixel values of the x-th row of pixels in the fifth sub-region D51 may be obtained. Pixel values of pixels from a first row to an n-th row in the fifth sub-region D51 are obtained according to the above method, and thus the image data of the fifth sub-region D51 can be obtained. For example, in the obtained image data of the fifth sub-region D51, pixel values of a row of pixels may form an arithmetic progression, so that a color of the fifth sub-region D51 changes uniformly in the row direction, which may provide the user with a good viewing feeling. For example, a method for obtaining the image data of the fifth sub-region D51 is as follows. The pixel value of the pixel in the x-th row and the y-th column in the fifth sub-region D51 can be obtained according to:

$R_{xy}=R_{x1}+(y-f+1)\times(R_{x1}-R_{x2})$;

$G_{xy}=G_{x1}+(y-f+1)\times(G_{x1}-G_{x2})$; and $B_{xy}=B_{x1}+(y-f+1)\times(B_{x1}-B_{x2})$.

Similarly, the fifth sub-region D52 includes n rows and (g+k) columns of pixels, and the fifth sub-region D52 may include a pixel xy which represents a pixel in an x-th row and a y-th column, where a value of x is within a range from 1 to n, and a value of y is within a range from g to (g+k). For the x-th row of pixels in the fifth sub-region D52, according to a change trend of a pixel value (including $R_{x(m-1)}$, $G_{x(m-1)}$ and $B_{x(m-1)}$) of a pixel x(m−1) and a pixel value (including $R_{xm}$, $G_{xm}$ and $B_{xm}$) of a pixel xm in the x-th row of pixels in the first image 510 in the row direction, pixel values of the x-th row of pixels in the fifth sub-region D52 may be obtained. Pixel values of pixels from a first row to an n-th row in the fifth sub-region D52 are obtained according to the above method, and thus the image data of the fifth sub-region D52 can be obtained. For example, a method for obtaining the image data of the fifth sub-region D52 is as follows. The pixel value of the pixel in the x-th row and the y-th column in the fifth sub-region D52 can be obtained according to:

$R_{xy}=R_{xm}+(y-g+1)\times(R_{xm}-R_{x(m-1)})$;

$G_{xy}=G_{xm}+(y-g+1)\times(G_{xm}-G_{x(m-1)})$; and $B_{xy}=B_{xm}+(y-g+1)\times(B_{xm}-B_{x(m-1)})$.

With regard to the sixth sub-region, referring to FIG. 9D, the sixth sub-region D61 includes (h+a) rows and m columns of pixels, and the sixth sub-region D61 may include a pixel xy which represents a pixel in an x-th row and a y-th column, where a value of x is within a range from h to (h+a), and a value of y is within a range from 1 to m. Since the color of the border F4 of the first image 510 gradually changes both in the row direction and in the column direction, pixel values of a plurality of pixels located in a column in the border F4 of the first image 510 have a certain change trend in the column direction, and pixel values of a corresponding column of pixels in the sixth sub-region D61 may be obtained according to this change trend. As a result, the change trend of the pixel values of all pixels in the corresponding column of pixels in the sixth sub-region D61 in the column direction is the same as a change trend of pixel values of the column of pixels in the border F4 of the first image 510 in the column direction. For example, for the y-th column of pixels in the sixth sub-region D61, according to a change trend of a pixel value (including $R_{1y}$, $G_{1y}$ and $B_{1y}$) of a pixel 1y and a pixel value (including $R_{2y}$, $G_{2y}$ and $B_{2y}$) of a pixel 2y in the border F4 of the first image 510 in the column direction, pixel values of the y-th column of pixels in the sixth sub-region D61 may be obtained. Pixel values of pixels from a first column to an m-th column in the sixth sub-region D61 are obtained according to the above method, and thus the image data of the sixth sub-region D61 can be obtained. For example, in the obtained image data of the sixth sub-region D61, pixel values of a column of pixels may form an arithmetic progression, so that a color of the sixth sub-region D61 changes uniformly in the column direction, which may provide the user with a good viewing feeling. For example, a method for obtaining the image data of the sixth sub-region D61 is as follows. The pixel value of the pixel in the x-th row and the y-th column in the sixth sub-region D61 can be obtained according to:

$R_{xy}=R_{1y}+(x-h+1)\times(R_{1y}-R_{2y})$;

$G_{xy}=G_{1y}+(x-h+1)\times(G_{1y}-G_{2y})$; and $B_{xy}=B_{1y}+(x-h+1)\times(B_{1y}-B_{2y})$.

Similarly, the sixth sub-region D62 includes (j+z) rows and m columns of pixels, and the sixth sub-region D62 may include a pixel xy which represents a pixel in an x-th row and a y-th column, where a value of x is within a range from j to (j+z), and a value of y is within a range from 1 to m. For the y-th column of pixels in the sixth sub-region D62, according to a change trend of a pixel value (including $R_{(n-1)y}$, $G_{(n-1)y}$ and $B_{(n-1)y}$) of a pixel (n−1)y and a pixel value (including $R_{ny}$, $G_{ny}$ and $B_{ny}$) of a pixel ny in the y-th column of pixels in the border F4 of the first image 510 in the column direction, pixel value of the y-th column of pixels in the sixth sub-region D62 may be obtained. Pixel values of pixels from a first column to an m-th column in the sixth sub-region D62 are obtained according to the above method, and thus the image data of the sixth sub-region D62 can be obtained. For example, a method for obtaining the image data of the sixth sub-region D62 is as follows. The pixel value of the pixel in the x-th row and the y-th column in the sixth sub-region D62 can be obtained according to:

$R_{xy}=R_{ny}+(x-j+1)\times(R_{ny}-R_{(n-1)y})$;

$G_{xy}=G_{ny}+(x-j+1)\times(G_{ny}-G_{(n-1)y})$; and $B_{xy}=B_{ny}+(x-j+1)\times(B_{ny}-B_{(n-1)y})$.

With regard to the seventh sub-region, for example, obtaining the image data of the seventh sub-regions based on the image data of the fifth sub-regions and/or the image data of the sixth sub-regions, may include:

averaging pixel values of two pixels adjacent to a pixel, respectively in the row direction and in the column direction, in a seventh sub-region to obtain a pixel value of the pixel in the seventh sub-region.

The method for generating the image data of the seventh sub-region will be described below by considering the seventh sub-region D71 as an example. Methods for generating image data of the seventh sub-regions D72, D73 and D74 are similar to the method for generating the image data of the seventh sub-region D71, and details will not be provided herein.

Referring to FIG. 9D, the seventh sub-region D71 includes x rows and y columns of pixels, and the seventh sub-region D71 may include a pixel xy which represents a pixel in an x-th row and a y-th column, where a value of x is within a range from h to (h+a), and a value of y is within a range from f to (f+i). For example, the method for generating the image data of the seventh sub-region D71 is as follows. A pixel value of an unknown pixel may be calculated based on pixel values of two adjacent pixels respectively in the row direction and the column direction by extrapolating from a pixel in the first row and the first column of the first image 510 filled in the base region B in the second image 520 to a pixel in an (h+a)-th row and an (f+i)-th column of the seventh sub-region D71. For example, a pixel value of a pixel in an h-th row and an f-th column in the seventh sub-region D71 is calculated based on a pixel value of a pixel in a first row and an f-th column in the fifth sub-region D51 and a pixel value of a pixel in an h-th row and a first column in the sixth sub-region D61. The calculation method may be averaging pixel values. For example, a pixel value of the pixel xy in the seventh sub-region D71 may be obtained according to:

$$R_{xy} = (R_{x(y-1)} + R_{(x-1)y})/2;$$

$$G_{xy} = (G_{x(y-1)} + G_{(x-1)y})/2; \text{ and}$$

$$B_{xy} = (B_{x(y-1)} + B_{(x-1)y})/2.$$

The method for generating the image data of the seventh sub-region D71 is, for another example, as follows. Based on the image data of the fifth sub-region D51 adjacent to the seventh sub-region D71, pixel values of a corresponding column of pixels in the seventh sub-region D71 are obtained using a method similar to the method for generating the image data of the sixth sub-region D61 based on the image data of the first image 510, that is, according to a change trend of pixel values of pixels located in a column in the border of the fifth sub-region D51 in the column direction, so as to obtain the image data of the seventh sub-region D71.

The method for generating the image data of the seventh sub-region D71 is, for yet another example, as follows. Based on the image data of the sixth sub-region D61 adjacent to the seventh sub-region D71, pixel values of a corresponding row of pixels in the seventh sub-region D71 are obtained using a method similar to the method for generating the image data of the fifth sub-region D51 based on the image data of the first image 510, that is, according to a change trend of pixel values of pixels located in a row in the border of the sixth sub-region D61 in the row direction, so as to obtain the image data of the seventh sub-region D71.

Figure 9E:
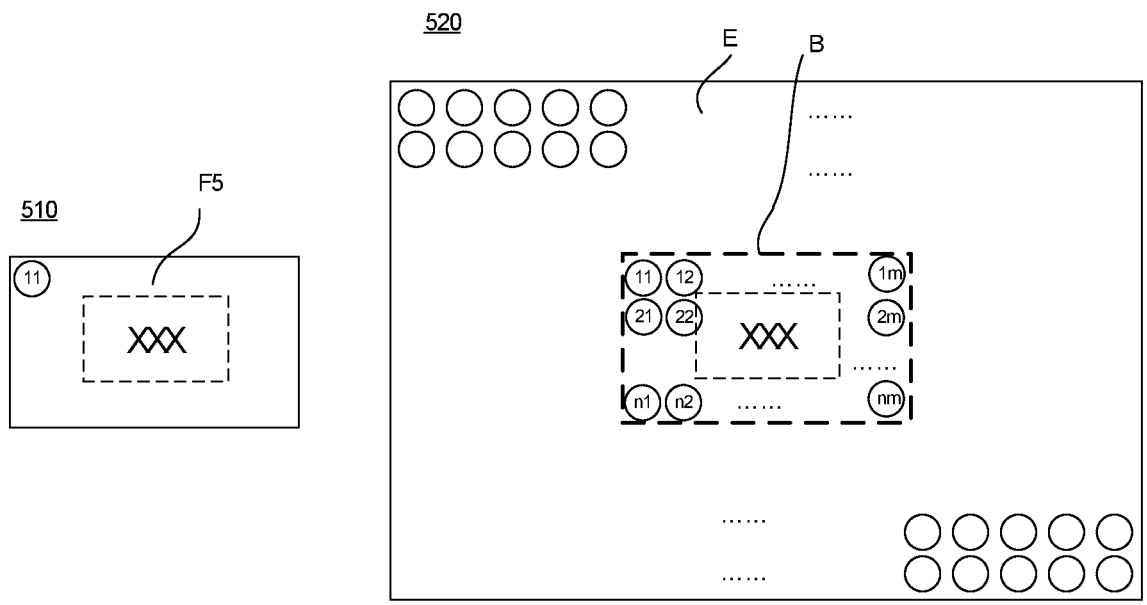
FIG. 9E is a schematic diagram of yet another first image and yet another second image, in accordance with some embodiments.

In some embodiments, referring to FIG. 9E, the first image 510 includes a border F5 that is irregular in color.

In this case, the pixel values of all the pixels in the first image 510 may be averaged to obtain a pixel value of each pixel in the extended region.

For example, the pixel value of each pixel in the extended region E is:

$$R_{xy} = (R_{11} + R_{12} + \ldots + R_{1m} + R_{21} + R_{22} + \ldots + R_{2m} + \ldots + R_{n1} + R_{n2} + \ldots + R_{nm})/(n \times m);$$

$$G_{xy} = (G_{11} + G_{12} + \ldots + G_{1m} + G_{21} + G_{22} + \ldots + G_{2m} + \ldots + G_{n1} + G_{n2} + \ldots + G_{nm})/(n \times m); \text{ and}$$

$$B_{xy} = (B_{11} + B_{12} + \ldots + B_{1m} + B_{21} + B_{22} + \ldots + B_{2m} + \ldots + B_{n1} + B_{n2} + \ldots + B_{nm})/(n \times m).$$

In the image processing method provided by the embodiments of the present disclosure, steps S201 and S203 may be performed simultaneously; alternatively, steps S201 and S203 may not be performed simultaneously, and there is no sequential order therebetween. In some embodiments, the image processing method includes the step S202, and in this case, the step S202 may be performed before the step S203.

Figure 10:
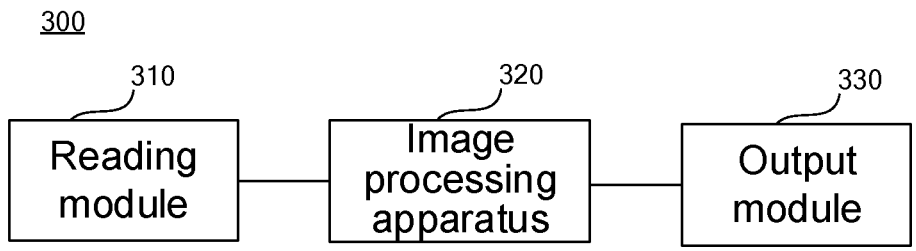
FIG. 10 is a structural diagram of yet another display control apparatus, in accordance with some embodiments.

Some embodiments of the present disclosure further provide a display control apparatus, and FIG. 10 shows a block diagram of the display control apparatus 300 provided by the embodiments of the present disclosure. The display control apparatus 300 includes a reading module 310, an image processing apparatus 320 and an output module 330.

The reading module 310 is configured to read image data of a startup picture in response to a case where the display control apparatus 300 is powered on. In some embodiments, the reading module 310 may perform the step S101 in the display control method provided by any of the above embodiments.

The image processing apparatus 320 is configured to perform the image processing method provided by any of the above embodiments to obtain the image data of the second image. The first image in the image processing method may be the startup picture read by the reading module.

The output module 330 is configured to output the image data of the second image, so as to control a display panel for display according to the image data of the second image, that is, to display the second image with a large resolution. In some embodiments, the output module 330 may perform the step S103 and/or the step S104 in the display control method described in any of the above embodiments.

Some embodiments of the present disclosure further provide an image processing apparatus. In some implementations, this image processing apparatus may be used as the image processing apparatus 320 in the display control apparatus shown in FIG. 10.

Figure 11:
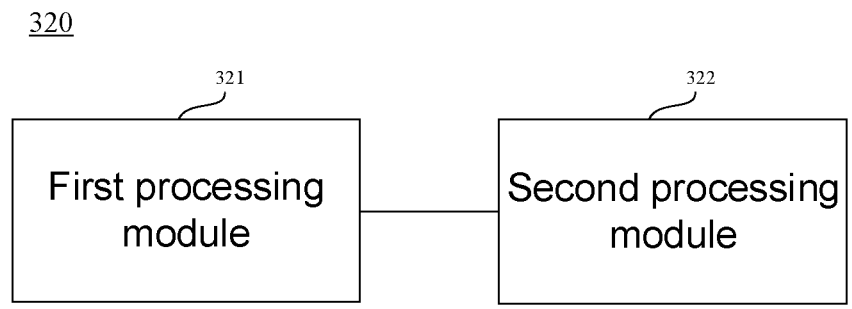
FIG. 11 is a structural diagram of an image processing apparatus, in accordance with some embodiments.

Referring to FIG. 11, the image processing apparatus 320 may include a first processing module 321 and a second processing module 322.

The first processing module 321 is configured to use the image data of the first image as the image data of the base region. For example, the first processing module 321 may perform the step S201 in the image processing method provided by any of the above embodiments.

The second processing module 322 is configured to generate, based on the image data of the first image, the image data of the extended region according to the extension policies, so as to obtain the image data of the second image including the image data of the base region and the image data of the extended region. For example, the second processing module 322 may perform the step S202 and/or the step S203 in the image processing method described in any of the above embodiments.

Embodiments of the image processing apparatus described in FIG. 11 and the display control apparatus described in FIG. 10 are merely exemplary. For example, the division of the above modules is only a logical functional division. In actual implementation, there may be other division manners. For example, a plurality of modules or components may be combined or integrated into another system, or some features may be omitted or not performed. All functional modules in the embodiments of the present disclosure may be integrated into one processing module, or each module may exist alone physically, or two or more modules may be integrated into a single module.

The above modules may be implemented in a form of hardware or in a form of software functional units. For example, when implemented in software, the above modules each may be implemented by a software functional module generated after at least one processor 101 in FIG. 3B reads program codes stored in the memory 102. Alternatively, the above modules may be implemented by different hardware in the display apparatus. Obviously, the above functional modules may also be implemented by combining software and hardware. For example, the reading module 310 and the image processing apparatus 320 in FIG. 10 may be implemented in a manner of program codes executed by the processor 101, and the output module 330 may be an output interface, e.g., a high-definition (HD) display protocol interface such as the eDP interface.

Figure 12:
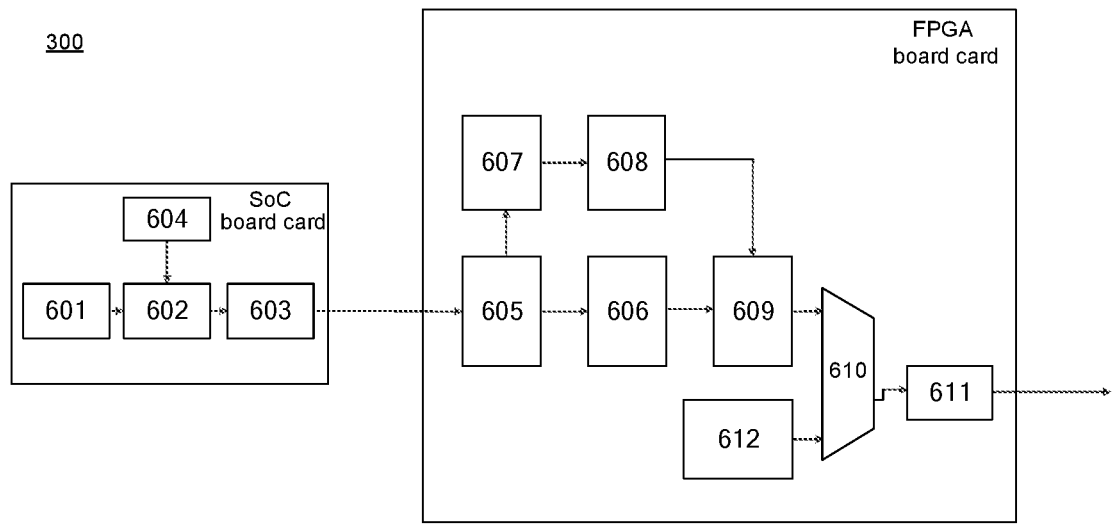
FIG. 12 is a structural diagram of yet another display control apparatus, in accordance with some embodiments.

Referring to FIG. 12, the display control apparatus provided by the embodiments of the present disclosure may be a chip system, including a SoC board card and a FPGA board card.

The SoC board card is configured to store and/or load a startup picture, and includes a startup picture storage module 601, a storage controller 602, a sending module 603 and a processor 604.

The startup picture storage module 601 is configured to store the startup picture. The startup picture storage module 601 may, for example, be a memory, for which reference may, for example, be made to the description of the memory 102 in FIG. 3B.

The storage controller 602 is configured to read out the startup picture from the startup picture storage module 601 and transmit it to the sending module 603 in response to a case where the display control apparatus 300 is powered on. For example, the storage controller 602 may be a direct memory access (DMA) controller.

The sending module 603 is configured to transmit the startup picture to the FPGA chip. For example, the sending module 603 includes a sending interface such as a LVDS interface, which is configured to transmit the startup picture to a FPGA chip through a LVDS protocol.

The processor 604 is configured to control the storage controller 602 and the sending module 603 to implement their respective functions. For the processor 604, reference may, for example, be made to the description of the processor 101 in FIG. 3B.

The FPGA board card is configured to identify the type of the startup picture and/or generate image data of a high-resolution image (e.g., the second image) based on the image data of the startup picture (e.g., the first image). The FPGA board card includes a receiving module 605, a storage module 606, a pixel sampling module 607, a type determination module 608, an image extension module 609, a selector 610 and a display output module 611. The pixel sampling module 607, the type determination module 608, the image extension module 609 and the selector 610 may be included in the FPGA chip.

The receiving module 605 is configured to receive the image data of the startup picture sent by the SoC board. For example, the receiving module 605 includes a receiving interface such as a LVDS interface, which is configured to receive the image data of the startup picture sent by the SoC board through the LVDS protocol.

The storage module 606 is configured to buffer the received image data of the startup picture by frame, so as to achieve synchronization with a subsequent system. For example, the storage module 606 may be a double data rate synchronous Dynamic Random Access Memory (DDR SDRAM).

The pixel sampling module 607 may be configured to perform a part of the step of identifying the type of the first image in the image processing method provided by any of the above embodiments, for example, perform the step S202 in FIG. 7.

The type determination module 608 may be configured to perform the other part of the step of identifying the type of the first image in the image processing method provided by any of the above embodiments, for example, perform the step S202 in FIG. 7.

The image extension module 609 may be configured to perform the step of generating the image data of the extended region according to the extension policies based on the image data of the first image in the image processing method provided by any of the above embodiments, for example, perform the step S203 in FIG. 7.

The selector 610 is configured to select to output data of the startup picture or data of a normal working picture. For example, the selector 610 may be configured to perform the step S103 and/or the step S104 in the display control method shown in FIG. 5. For example, an initial state of the selector 610 may be set to display the startup picture. That is, in response to the case where the display control apparatus is powered on, the display apparatus is in the startup initialization state, and the selector 610 selects to display the startup picture, so as to output the image data of the second image in response to a case where the display control apparatus is in the startup initialization state. When the startup initialization state ends, the SoC chip may transmit a signal to the selector 610, so that the selector 610 selects a working picture (i.e., a normal display image to be displayed after the startup image).

The display output module 611 is configured to output the selected picture to a display screen at a rear end. The display output module 611 may be an output interface, for example, at least one of the eDP interface and the V-by-One interface.

In some embodiments, the FPGA board card may further include a front-end processing system 612 for processing the received image data of the working picture and outputting the processed image data to the selector. The processing may include, for example, hue adjustment, brightness adjustment, contrast adjustment, chromaticity calibration, and the like.

In the embodiments of the present disclosure, the functions implemented by the display apparatus, the display control apparatus and the image processing apparatus are similar to the functions implemented by the steps in the display control method and the image processing method. For specific implementation of the functions, reference may be made to the relevant description of corresponding steps in the above method embodiments, and details will not be repeated herein. Accordingly, the display apparatus, the display control apparatus and the image processing apparatus provided by the embodiments of the present disclosure may realize an effect of using the image data of a low-resolution image to enable the display apparatus to display a high-resolution image.

All the embodiments in the specification are described in a progressive manner, the same or similar parts between the embodiments are referred to each other, and each embodiment focuses on differences from other embodiments.

The above embodiments may be implemented in whole or in part by software, hardware, firmware, or any combination thereof. When the embodiments are implemented by using a software program, the software program may be implemented in a form of a computer program product in whole or in part. The computer program product includes computer program instructions that, when executed by a computer (e.g. the display apparatus), cause the computer to perform the image processing method provided by any of the above embodiments or the display control method provided by any of the above embodiments. The computer program instructions may be stored in a computer-readable storage medium or transmitted from one computer-readable storage medium to another computer-readable storage medium. For example, the computer program instructions may be transmitted from one website, computer, server or data center to another website, computer, server or data center via a wired (e.g., a coaxial cable, an optical fiber, a digital subscriber line (DSL)) manner or a wireless (e.g., infrared, wireless, microwave, etc.) manner.

The embodiments of the present disclosure further provide a computer program. When the computer program is executed by a computer (e.g., the display apparatus), the computer program causes the computer to perform the image processing method provided by any of the above embodiments or the display control method provided by any of the above embodiments.

The embodiments of the present disclosure further provide a non-transitory computer-readable storage medium. The computer-readable storage medium has stored therein computer program instructions that, when run on a computer (e.g., the display apparatus), cause the computer to perform the image processing method provided by any of the above embodiments or the display control method provided by any of the above embodiments.

The computer-readable storage medium may be any available medium that can be accessed by a computer, or a server integrated by one or more available media, a data center integrated by one or more available media, and other data storage devices. The available medium may be a magnetic medium (e.g., a floppy disk, a magnetic disk or a magnetic tape), an optical medium (e.g., a digital versatile disk (DVD)), or a semiconductor medium (e.g., a solid state drive (SSD)), etc.

The foregoing descriptions are merely specific implementation manners of the present disclosure, but the protection scope of the present disclosure is not limited thereto. Changes or replacements that any person skilled in the art could conceive of within the technical scope of the present disclosure shall all be included in the protection scope of the present disclosure. Therefore, the scope of the present disclosure shall be subject to the protection scope of the claims.

What is claimed is:

1. An image processing method, comprising:
using image data of a first image as image data of a base region, wherein the first image has a first resolution; and
generating, based on the image data of the first image, image data of an extended region according to extension policies, so as to obtain image data of a second image including the image data of the base region and the image data of the extended region, wherein the second image has a second resolution, and the first resolution is less than the second resolution;
the image processing method further comprising:
identifying a type of the first image according to pixel values of a plurality of pixels in a border of the first image; and
generating, based on the image data of the first image, the image data of the extended region according to the extension policies, includes:
generating, based on the image data of the first image, the image data of the extended region according to an extension policy corresponding to the type of the first image.

2. The image processing method according to claim 1, wherein
generating, based on the image data of the first image, the image data of the extended region according to the extension policies, includes:
generating, based on a pixel value of at least one pixel in the border of the first image, the image data of the extended region according to the extension policies.

3. The image processing method according to claim 2, wherein
the border of the first image includes a solid-colored border; and
generating, based on the pixel value of the at least one pixel in the border of the first image, the image data of the extended region according to the extension policies, includes:
using a pixel value of a single pixel in the border of the first image as a pixel value of each pixel in the extended region, so as to obtain the image data of the extended region.

4. The image processing method according to claim 2, wherein
the border of the first image includes a non-solid-colored border; and
generating, based on the pixel value of the at least one pixel in the border of the first image, the image data of the extended region according to the extension policies, includes:
generating, based on pixel values of a plurality of pixels in the border of the first image, the image data of the extended region according to the extension policies.

5. The image processing method according to claim 4, wherein
the non-solid-colored border of the first image includes a border, a color of which gradually changes in a column direction and does not change in a row direction;
the extended region includes first sub-regions and second sub-regions except the first sub-regions, and the first sub-regions are flush with the base region in the row direction;
generating, based on the pixel values of the plurality of pixels in the border of the first image, the image data of the extended region according to the extension policies, includes:
generating, according to a pixel value of at least one pixel, located at the border, in each row of pixels of the first image, a pixel value of each pixel in a corresponding row of pixels in the first sub-regions; and
obtaining, according to a change trend of the pixel values of the plurality of pixels in the border of the first image in the column direction, pixel values of a plurality of rows of pixels that change in the column direction in the second sub-regions, wherein each row of pixels have the same pixel value, and each pixel value is within a range of a pixel value.

6. The image processing method according to claim 5, wherein
generating, according to the pixel value of the at least one pixel, located at the border, in each row of pixels of the first image, the pixel value of each pixel in the corresponding row of pixels in the first sub-regions, includes:

using a pixel value of a pixel, located at the border, in each row of pixels of the first image as the pixel value of each pixel in the corresponding row of pixels in the first sub-regions.

7. The image processing method according to claim 4, wherein
the non-solid-colored border of the first image includes a border, a color of which gradually changes in a row direction and does not change in a column direction;
the extended region includes third sub-regions and fourth sub-regions except the third sub-regions, and the third sub-regions are flush with the base region in the column direction;
generating, based on the pixel values of the plurality of pixels in the border of the first image, the image data of the extended region according to the extension policies, includes:
generating, according to a pixel value of at least one pixel, located at the border, in each column of pixels of the first image, a pixel value of each pixel in a corresponding column of pixels in the third sub-regions; and
obtaining, according to a change trend of the pixel values of the plurality of pixels in the border of the first image in the row direction, pixel values of a plurality of columns of pixels that change in the row direction in the fourth sub-regions, wherein each column of pixels have the same pixel value, and each pixel value is within a range of a pixel value.

8. The image processing method according to claim 7, wherein
generating, according to the pixel value of the at least one pixel, located at the border, in each column of pixels of the first image, the pixel value of each pixel in the corresponding column of pixels in the third sub-regions, includes:
using a pixel value of a pixel, located at the border, in each column of pixels of the first image as the pixel value of each pixel in the corresponding column of pixels of the third sub-regions.

9. The image processing method according to claim 4, wherein
the non-solid-colored border of the first image includes a border, a color of which gradually changes both in a column direction and in a row direction;
the extended region includes fifth sub-regions, sixth sub-regions, and seventh sub-regions except the fifth sub-regions and the sixth sub-regions, the fifth sub-regions are flush with the base region in the row direction, and the sixth sub-regions are flush with the base region in the column direction;
generating, based on the pixel values of the plurality of pixels in the border of the first image, the image data of the extended region according to the extension policies, includes:
obtaining, according to a change trend of pixel values of pixels in a row in the border of the first image in the row direction, pixel values of a corresponding row of pixels in the fifth sub-regions, so as to obtain image data of the fifth sub-regions, wherein each pixel value is within a range of a pixel value;
obtaining, according to a change trend of pixel values of pixels in a column in the border of the first image in the column direction, pixel values of a corresponding column of pixels in the sixth sub-regions, so as to obtain image data of the sixth sub-regions, wherein each pixel value is within the range of the pixel value; and
obtaining image data of the seventh sub-regions based on the image data of the fifth sub-regions and/or the image data of the sixth sub-regions.

10. The image processing method according to claim 9, wherein
obtaining the image data of the seventh sub-regions based on the image data of the fifth sub-regions and/or the image data of the sixth sub-regions, includes:
averaging pixel values of two pixels adjacent to a pixel, respectively in the row direction and in the column direction, in a seventh sub-region to obtain a pixel value of the pixel in the seventh sub-region.

11. The image processing method according to claim 9, wherein
obtaining the image data of the seventh sub-regions based on the image data of the fifth sub-regions and/or the image data of the sixth sub-regions, includes:
obtaining, according to a change trend of pixel values of pixels in a row in a border of a sixth sub-region adjacent to a seventh sub-region in the row direction, pixel values of a corresponding row of pixels in the seventh sub-region, wherein each pixel value is within the range of the pixel value;
or
obtaining, according to a change trend of pixel values of pixels in a column in a border of a fifth sub-region adjacent to a seventh sub-region in the column direction, pixel values of a corresponding column of pixels in the seventh sub-region, wherein each pixel value is within the range of the pixel value.

12. An image processing method, comprising:
using image data of a first image as image data of a base region, wherein the first image has a first resolution; and
generating, based on the image data of the first image, image data of an extended region according to extension policies, so as to obtain image data of a second image including the image data of the base region and the image data of the extended region, wherein the second image has a second resolution, the first resolution is less than the second resolution, wherein
generating, based on the image data of the first image, the image data of the extended region according to the extension policies, includes:
generating the image data of the extended region according to pixel values of all pixels in the first image.

13. The image processing method according to claim 1, wherein
the border of the first image includes two first sub-borders parallel to a row direction and two second sub-borders parallel to a column direction; and
identifying the type of the first image according to the pixel values of the plurality of pixels in the border of the first image, includes:
determining the type of the first image according to a change trend of pixel values of pixels in each first sub-border in the row direction and a change trend of pixel values of pixels in each second sub-border in the column direction.

14. The image processing method according to claim 13, wherein
the type of the first image is a first type, a second type, a third type, a fourth type or a fifth type;
the first type is configured to represent that the border of the first image includes a solid-colored border;
the second type is configured to represent that the border of the first image includes a border, a color of which gradually changes in the column direction and does not change in the row direction;

the third type is configured to represent that the border of the first image includes a border, a color of which gradually changes in the row direction and does not change in the column direction;

the fourth type is configured to represent that the border of the first image includes a border, a color of which gradually changes both in the column direction and in the row direction; and the fifth type is configured to represent that the border of the first image includes a border irregular in color;

determining the type of the first image according to the change trend of the pixel values of the pixels in each first sub-border in the row direction and the change trend of the pixel values of the pixels in each second sub-border in the column direction, includes:

determining a first determination result of each first sub-border, wherein if pixel values of all pixels in each row of pixels in the first sub-border are approximately equal, the first determination result includes equality, otherwise the first determination result includes inequality; if the pixel values of all the pixels in each row of pixels in the first sub-border gradually change, the first determination result includes gradual change, otherwise the first determination result includes no gradual change; and determining a second determination result of each second sub-border, wherein if pixel values of all pixels in each column of pixels in the second sub-border are approximately equal, the second determination result includes equality, otherwise the second determination result includes inequality; if the pixel values of all the pixels in each column of pixels in the second sub-border gradually change, the second determination result includes gradual change, otherwise the second determination result includes no gradual change, wherein if the first determination result of each first sub-border and the second determination result of each second sub-border both include equality, the first image is of the first type;

if the first determination result of each first sub-border includes equality and the second determination result of each second sub-border includes gradual change, the first image is of the second type;

if the first determination result of each first sub-border includes gradual change and the second determination result of each second sub-border includes equality, the first image is of the third type;

if the first determination result of each first sub-border and the second determination result of each second sub-border both include gradual change, the first image is of the fourth type; and if at least one of the first determination result of each first sub-border and the second determination result of each second sub-border includes both inequality and no gradual change, the first image is of the fifth type.

15. A display control method applied to a display control apparatus, the display control method comprising:

reading image data of a startup picture;

performing the image processing method according to claim 1 to obtain the image data of the second image, wherein the first image in the image processing method is the startup picture; and outputting the image data of the second image to control a display panel for display according to the image data of the second image.

16. The display control method according to claim 15, wherein outputting the image data of the second image, includes:

outputting the image data of the second image in response to a case where the display control apparatus is in a startup initialization state; and the display control method further comprises:

outputting image data of a working picture in response to an end of the startup initialization state of the display control apparatus.

17. A non-transitory computer-readable storage medium having stored therein computer program instructions that, when run on a computer, cause the computer to perform the image processing method according to claim 1.

18. A non-transitory computer-readable storage medium having stored therein computer program instructions that, when run on a computer, cause the computer to perform the display control method according to claim 15.

19. The image processing method according to claim 12, wherein the first image includes a border irregular in color; and generating the image data of the extended region according to the pixel values of all the pixels in the first image, includes:

averaging the pixel values of all the pixels in the first image to obtain a pixel value of each pixel in the extended region.

\* \* \* \* \*